United States Patent
Lee et al.

(10) Patent No.: US 10,205,190 B2
(45) Date of Patent: Feb. 12, 2019

(54) COMPOSITE ELECTROLYTE INCLUDING POLYMERIC IONIC LIQUID AND INORGANIC PARTICLES AND LITHIUM BATTERY INCLUDING THE SAME

(71) Applicant: Samsung Electronics Co., Ltd., Suwon-si, Gyeonggi-do (KR)

(72) Inventors: Jenam Lee, Seongnam-si (KR); Soyeon Kim, Suwon-si (KR); Seoksoo Lee, Yongin-si (KR); Jusik Kim, Seongnam-si (KR); Joungwon Park, Yongin-si (KR); Myungjin Lee, Seoul (KR); Yonggun Lee, Incheon (KR); Hongsoo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 236 days.

(21) Appl. No.: 14/834,940

(22) Filed: Aug. 25, 2015

(65) Prior Publication Data

US 2016/0064770 A1 Mar. 3, 2016

(30) Foreign Application Priority Data

Aug. 28, 2014 (KR) .................. 10-2014-0113357
May 14, 2015 (KR) .................. 10-2015-0067599

(51) Int. Cl.
| | | |
|---|---|---|
| H01M 4/38 | (2006.01) | |
| H01M 10/052 | (2010.01) | |
| H01M 10/056 | (2010.01) | |
| H01M 10/0565 | (2010.01) | |
| H01M 10/0569 | (2010.01) | |

(52) U.S. Cl.
CPC ......... *H01M 10/056* (2013.01); *H01M 4/382* (2013.01); *H01M 10/052* (2013.01); *H01M 10/0565* (2013.01); *H01M 10/0569* (2013.01); H01M 2300/0028 (2013.01); H01M 2300/0082 (2013.01); H01M 2300/0085 (2013.01); *H01M 2300/0094* (2013.01); *Y02T 10/7011* (2013.01)

(58) Field of Classification Search
CPC ........... H01M 10/056; H01M 10/0565; H01M 10/052; H01M 10/0569; H01M 4/382
USPC ....... 429/303, 188, 306, 313, 314, 317, 337, 429/338, 339, 340, 342
See application file for complete search history.

(56) References Cited

U.S. PATENT DOCUMENTS

| | | |
|---|---|---|
| 4,357,215 A | 11/1982 | Goodenough et al. |
| 7,513,136 B2 | 4/2009 | Laliberte et al. |
| 7,531,012 B2 | 5/2009 | Sudano et al. |
| 7,547,492 B2 | 6/2009 | Awano et al. |

(Continued)

FOREIGN PATENT DOCUMENTS

| | | |
|---|---|---|
| JP | 200649158 | 2/2006 |
| JP | 200649158 A | 2/2006 |

(Continued)

OTHER PUBLICATIONS

Miyoshi et al., Machine translation of JP 2011-054519 A, Mar. 2011 (Year: 2011).*

(Continued)

*Primary Examiner* — Sean P Cullen
(74) *Attorney, Agent, or Firm* — Cantor Colburn LLP

(57) ABSTRACT

A composite electrolyte including a polymeric ionic liquid; a plurality of inorganic particles; and an organic electrolyte.

34 Claims, 7 Drawing Sheets

(56) References Cited

U.S. PATENT DOCUMENTS

| | | | |
|---|---|---|---|
| 7,968,224 B2 | 6/2011 | Sudano et al. | |
| 8,268,197 B2 | 9/2012 | Singh et al. | |
| 2006/0120021 A1 | 6/2006 | Banno et al. | |
| 2009/0104523 A1* | 4/2009 | Mullin | C08F 297/02 |
| | | | 429/188 |
| 2009/0263725 A1 | 10/2009 | Balsara et al. | |
| 2011/0206994 A1 | 8/2011 | Balsara et al. | |
| 2011/0281173 A1 | 11/2011 | Singh et al. | |
| 2011/0281197 A1* | 11/2011 | Daikoku | C08F 226/04 |
| | | | 429/480 |
| 2011/0318614 A1* | 12/2011 | Takeshi | H01M 6/166 |
| | | | 429/50 |
| 2012/0231346 A1 | 9/2012 | Tsujii et al. | |
| 2013/0273435 A1 | 10/2013 | Leitner et al. | |
| 2013/0330623 A1* | 12/2013 | Matsushita | H01M 4/485 |
| | | | 429/220 |
| 2014/0088207 A1 | 3/2014 | Elabd et al. | |
| 2015/0155594 A1 | 6/2015 | Lee et al. | |
| 2016/0064770 A1 | 3/2016 | Lee et al. | |
| 2016/0064772 A1 | 3/2016 | Choi et al. | |
| 2016/0079625 A1 | 3/2016 | Shon et al. | |
| 2016/0093879 A1 | 3/2016 | Song et al. | |
| 2016/0164137 A1* | 6/2016 | Moganty | H01M 10/0565 |
| | | | 429/306 |
| 2016/0190641 A1* | 6/2016 | Lee | H01M 10/0565 |
| | | | 429/303 |

FOREIGN PATENT DOCUMENTS

| | | | |
|---|---|---|---|
| JP | 2010285508 A | | 12/2010 |
| JP | 2011-054519 A | | 3/2011 |
| JP | 2011054519 A | * | 3/2011 |
| KR | 1020140046611 A | | 4/2014 |
| WO | 2014011661 A3 | | 1/2014 |

OTHER PUBLICATIONS

Yuan et al., Poly(ionic liquid)s: Polymers expanding classical property profiles, Jan. 2011, Polymer, 52, 1469-1482 (Year: 2011).*
Pont et al., Pyrrolidinium-based polymeric ionic liquids as mechanically and electrochemically stable polymer electrolytes, Dec. 2008, Journal of Power Sources, 188, 558-563 (Year: 2008).*
Shaplov et al, Polymer Ionic Liquids: Synthesis, Design and Application in Electrochemistry as Ion Conducting Materials, 2011, Electrochemical Properties and Applications of Ionic Liquids, Nova Science, 203-298 (Year: 2011).*
Mecerreyes, David, Polymeric ionic liquids: Broadening the properties and applications of polyelectrolytes, May 2011, Progress in Polymer Science, 36, 1629-1648 (Year: 2011).*
Wikipedia contributors, "Natural number," Wikipedia, The Free Encyclopedia, https://en.wikipedia.org/wiki/Natural_number (accessed Mar. 5, 2018). (Year: 2018).*
Korean Office Action dated Dec. 21, 2016 issued for the Korean Patent Application No. 10-2015-0067599, with English Translation.
Nawon Jeon et al. "Dye-Sensitized Solar Cells Assembled with Composite Gel Polymer Electrolytes Containing Nanosized Al2O3 Particles", J. Nanosci. Nanotechnol. 2013, vol. 13, No. 12, pp. 7955-7958.
Ruisi Zhang "Advanced gel polymer electrolyte for lithium-ion polymer batteries", (2013), Graduate Theses and Dissertations Paper, Iowa State University, pp. 1-98.
Anne-Laure Pont et al. "Pyrrolidinium-based polymeric ionic liquids as mechanically and electrochemically stable polymer electrolytes", Journal of Power Sources 188 (2009) 558-563.
Je-Nam Lee et al. "N-(triphenylphosphoranylidene)aniline as a novel electrolyte additive for high voltage LiCoO2 operations in lithium ion batteries", Electrochimica Acta 56 (2011) 5195-5200.
Mingli Guo et al. "Synthesis and characterization of novel anion exchange membranes based on imidazolium-type ionic liquid for alkaline fuel cells", Journal of Membrane Science 362 (2010) 97-104.
Bencai Lin et al. "Poly(ionic liquid)/ionic liquid/graphene oxide composite quasi solid-state electrolytes for dye sensitized solar cells", RSC Adv., 2015, 5, 57216-57222.
Extended European Search Report issued by the European Patent Office for EP 15 18 2337 dated Jan. 29, 2016.
G.B. Appetecchi et al. "Ternary polymer electrolytes containing pyrrolidinium-based polymeric ionic liquids for lithium batteries", Journal of Power Sources 195 (2010) 3668-3675.
Korean Office Action dated Jun. 16, 2016 of the Korean Patent Application No. 10-2015-0067599 with English language translation.
Nawon Jeon et al. "Dye-Sensitized Solar Cells Assembled with Composite Gel Polymer Electrolytes Containing Nanosized Al2O3 Particles", Journal of Nanoscience and Nanotechnology, 2013, vol. 13, No. 12, pp. 7955-7958 (Previously Submitted on Mar. 31, 2016).
Examination Report Issued by the European Patent Office dated Apr. 5, 2018 in the examination of the European Patent Application No. 15182337.4-1103.
Office Action issued by the Chinese Patent Office dated Oct. 8, 2018, in the examination of the Chinese Patent Application No. 201510542031.4 with English Translation.

* cited by examiner

COMPOSITE ELECTROLYTE INCLUDING POLYMERIC IONIC LIQUID AND INORGANIC PARTICLES AND LITHIUM BATTERY INCLUDING THE SAME

CROSS-REFERENCE TO RELATED APPLICATION

This application claims priority to and the benefit of Korean Patent Application No. 10-2014-0113357, filed on Aug. 28, 2014, in the Korean Intellectual Property Office and Korean Patent Application No. 10-2015-0067599, filed on May 14, 2015, in the Korean Intellectual Property Office, the disclosures of which are incorporated herein in their entirety by reference.

BACKGROUND

1. Field

The present disclosure relates to a composite electrolyte and a lithium battery including the same.

2. Description of the Related Art

Carbonaceous materials, such as graphite, are representative examples of anode active materials suitable for use in lithium batteries. Graphite has good capacity retention characteristics, high potential characteristics, and ensures battery's high stability because there is no volumetric change during intercalation or deintercalation of lithium. Graphite has a low theoretical electric capacity of about 372 milli Ampere hours per gram (mAh/g).

A lithium metal may be used as an anode active material for lithium batteries. A lithium metal may have a very high electrical capacity per unit mass. During intercalation or deintercalation process of lithium ions, a dendrite structure may be formed on a surface of the lithium metal, which may cause a short circuit between a cathode and an anode. Also, the lithium metal is highly reactive to a liquid electrolyte during charging/discharging.

In order to suppress high reactivity of the lithium metal, a solid electrolyte may be introduced on a surface of the lithium metal. For example, lithium phosphorous oxynitride (LiPON), which is one type of an inorganic electrolyte, has a substantially low lithium ion conductivity of $2 \times 10^{-6}$ Siemens per centimeter (S/cm) or lower at room temperature and has a very high resistance at its thickness of 200 nanometers (nm) or greater. For example, one type of a glass-ceramic solid electrolyte, LATP, is fragile, and a transition metal in the solid electrolyte may react with lithium.

Therefore, there remains a need for an electrolyte that has flexibility and a high ion conductivity as well as stability with respect to a lithium metal.

SUMMARY

Provided is a composite electrolyte.

Provided is a lithium battery including the composite electrolyte.

Additional aspects will be set forth in part in the description which follows and, in part, will be apparent from the description, or may be learned by practice of the presented exemplary embodiments.

According to an aspect of an exemplary embodiment, a composite electrolyte includes a polymeric ionic liquid; a plurality of inorganic particles; and an organic electrolyte.

According to an aspect of another exemplary embodiment, a lithium battery includes:

a cathode;
an anode; and
an electrolyte layer disposed on at least a part of the anode,
wherein the electrolyte layer includes the composite electrolyte.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
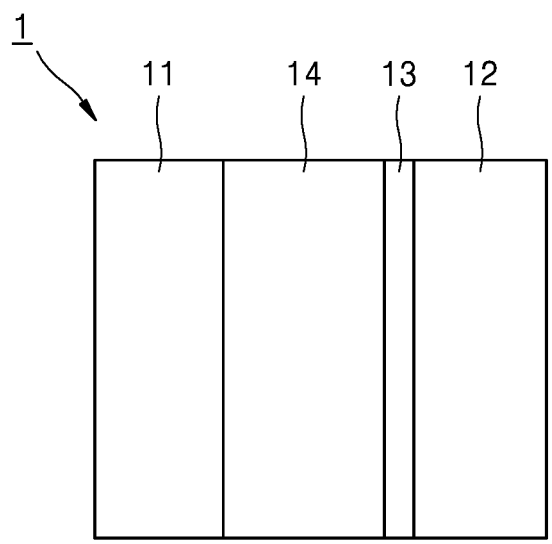
FIG. 1 is a schematic view of a lithium battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to exemplary embodiments, a composite electrolyte and a lithium battery including the composite electrolyte will be described in detail.

According to an embodiment, a composite electrolyte includes a polymeric ionic liquid; a plurality of inorganic particles; and an organic electrolyte.

In a conventional electrolyte, an ion conductivity and a mechanical strength are in a so-called trade-off relationship. Particularly, an ion conductivity is poor when a mechanical strength increases, and a mechanical strength is poor when an ion conductivity increases. Further, dendrites are readily formed due to uneven distribution of ions at an interface between an electrolyte and an electrode. In contrast, in the composite electrolyte according to an embodiment, which simultaneously includes the polymeric ionic liquid, a plurality of inorganic particles, and organic electrolyte, the formation of dendrites is suppressed by achieving an even distribution of ions at an interface between an electrolyte and an electrode, and thus, an improved ion conductivity and an increased mechanical strength is provided.

Further, the composite electrolyte may provide electrochemical stability.

The composite electrolyte may be electrochemically stable with respect to lithium in a voltage range of about 0 Volts (V) to about 5.5 V. For example, the composite electrolyte may be electrochemically stable with respect to lithium in a voltage range of about 0 V to about 5.0 V. For example, the composite electrolyte may be electrochemically stable with respect to lithium in a voltage range of about 0 V to about 4.2 V. Because of the wide voltage window which is electrochemically stable, the composite electrolyte may be used in an electrochemical device that operates at a high voltage.

For example, the composite electrolyte may have a current density of 0.05 milli Amperes per square centimeter ($mA/cm^2$) or less due to side reactions besides intercalation/deintercalation of lithium ions at a voltage of around 0 V with respect to lithium metal. For example, the composite electrolyte may have a current density of 0.02 $mA/cm^2$ or less due to side reactions besides intercalation/deintercalation of lithium ions at a voltage of around 0 V with respect to lithium metal. For example, the composite electrolyte may have a current density of 0.01 $mA/cm^2$ or less due to side reactions besides intercalation/deintercalation of lithium ions at a voltage of around 0 V with respect to lithium metal.

For example, the composite electrolyte may have a current density of 0.05 $mA/cm^2$ or less due to oxidation reaction at a voltage of around 5.0 V with respect to lithium. For example, the composite electrolyte may have a current density of 0.04 $mA/cm^2$ or less due to oxidation reaction at a voltage of around 5.0 V with respect to lithium. For example, the composite electrolyte may have a current density of 0.02 $mA/cm^2$ or less due to oxidation reaction at a voltage of around 5.0 V with respect to lithium.

The composite electrolyte may have an ion conductivity of about $1 \times 10^{-4}$ Siemens per centimeter (S/cm) or greater at room temperature. For example, the composite electrolyte may have an ion conductivity of about $5 \times 10^{-4}$ S/cm or greater at room temperature. For example, the composite electrolyte may have an ion conductivity of about $1 \times 10^{-3}$ S/cm or greater at room temperature. The composite electrolyte may provide a high ion conductivity by including an organic electrolyte.

The composite electrolyte may form a non-self-standing film. The composite electrolyte may form a film of a flexible composition so that a volumetric change of an anode may be easily accommodated, and the composite electrolyte may not be readily cracked. For example, when an amount of the inorganic particles in the composite electrolyte is high, the self-sanding film may have difficulties forming, and thus a film or a layer may be formed on another substrate or a support. Thus, the composite electrolyte may constitute an improvement over a conventional inorganic electrolyte and/or composite electrolyte that forms a self-standing film, which has no flexibility and may be easily cracked.

When the composite electrolyte includes a plurality of inorganic particles, a mechanical strength and an ion conductivity of the composite electrolyte may simultaneously improve.

The inorganic particles may include at least one selected from a metal oxide, a metal hydroxide, a metal carbonate, a metal carboxylate, a metal silicate, a metal aluminosilicate, a metal carbide, a metal nitride, a metal halide (for example, metal fluoride), a metal nitrate, a carbon oxide, a carbonaceous material, and an organic-inorganic complex, but it is not limited thereto, and any material available in the art that may improve an ion conductivity of an electrolyte and increase a mechanical strength of an electrolyte may be used. For example, the inorganic particles may be at least one selected from $Al_2O_3$, $SiO_2$, $BaTiO_3$, metal organic framework (MOF), graphite oxide, graphene oxide, polyhedral oligomeric silsesquioxanes (POSS), $Li_2CO_3$, $Li_3PO_4$, $Li_3N$, $Li_3S_4$, $Li_2O$, and montmorillonite.

A particle diameter of the inorganic particles may be less than 100 nanometers (nm). For example, a particle diameter of the inorganic particles may be in a range of about 1 nm to about 100 nm. For example, a particle diameter of the inorganic particles may be in a range of about 5 nm to about 100 nm. For example, a particle diameter of the inorganic particles may be in a range of about 5 nm to about 70 nm. For example, a particle diameter of the inorganic particles may be in a range of about 5 nm to about 50 nm. For example, a particle diameter of the inorganic particles may be in a range of about 5 nm to about 30 nm. For example, a particle diameter of the inorganic particles may be in a range of about 10 nm to about 30 nm.

In the composite electrolyte, a content of the inorganic particles may be about 1 percent by weight (wt %) to about 95 wt % based on the total weight of the inorganic particles and a polymeric ionic liquid. For example, a content of the inorganic particles may be about 5 wt % to about 90 wt % based on the total weight of the inorganic particles and a polymeric ionic liquid. For example, a content of the inorganic particles may be about 10 wt % to about 90 wt % based on the total weight of the inorganic particles and a polymeric ionic liquid. For example, a content of the inorganic particles may be about 20 wt % to about 90 wt % based on the total weight of the inorganic particles and a polymeric ionic liquid. For example, a content of the inorganic particles may be about 30 wt % to about 90 wt % based on the total weight of the inorganic particles and a polymeric ionic liquid. For example, a content of the inorganic particles may be about 35 wt % to about 90 wt % based on the total weight of the inorganic particles and a polymeric ionic liquid. For example, a content of the inorganic particles may be about 40 wt % to about 90 wt % based on the total weight of the inorganic particles and a polymeric ionic liquid. For example, a content of the inorganic particles may be about 45 wt % to about 90 wt % based on the total weight of the inorganic particles and a polymeric ionic liquid. For example, a content of the inorganic particles may be about 50 wt % to about 90 wt % based on the total weight of the inorganic particles and a polymeric ionic liquid. For example, a content of the inorganic particles may be about 55 wt % to about 90 wt % based on the total weight of the inorganic particles and a polymeric ionic liquid. For example, a content of the inorganic particles may be about 60 wt % to about 90 wt % based on the total weight of the inorganic particles and a polymeric ionic liquid. In the composite electrolyte, when an amount of the inorganic particles is about 95 wt % or greater, the inorganic particles may not be evenly distributed, and the composite electrolyte film may be easily broken by an impact.

The inorganic particles may be porous. For example, the inorganic particles may be mesoporous particles. Examples of the inorganic particles may include, as stated above, particular inorganic particles such as $Al_2O_3$ and $SiO_2$ in a porous form.

The inorganic particles may have various shapes. For example, the inorganic particle may have a spherical shape, an elliptical shape, a cubical shape, a tetrahedral shape, a pyramidal shape, an octahedral shape, a cylindrical shape, a polygonal pillar-like shape, a conical shape, a columnar shape, a tubular shape, a helical shape, a funnel shape, a dendritic shape, or any of various common regular and irregular shapes.

In the composite electrolyte, the polymeric ionic liquid may be obtained by polymerizing ionic liquid monomers, and the polymeric ionic liquid may be insoluble in water but soluble in an organic solvent. Also, the polymeric ionic liquid includes a backbone and a counter ion, where the counter ion is not an inorganic ion, such as a halide ion, e.g., $Cl^-$, $Br^-$, or $I^-$, but an organic ion. Accordingly, the composite electrolyte is different from a general polyelectrolyte. The composite electrolyte includes the polymeric ionic liquid, and thus ions may be more homogeneously distributed within the composite electrolyte.

In the composite electrolyte, the polymeric ionic liquid may be at least one selected from cationic polymeric ionic liquid, anionic polymeric ionic liquid, and zwitterionic polymeric ionic liquid.

The cationic polymeric liquid includes a cation in its backbone, and a counter ion of the cationic polymeric liquid is an anion. For example, the cationic polymeric liquid may have a structure selected from structures 1 to 33 below:

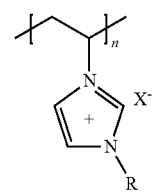

1

2
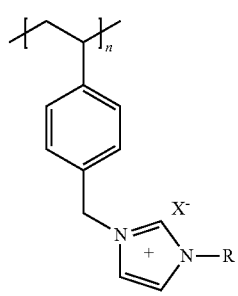
3
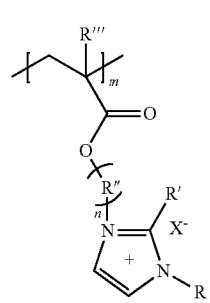
4
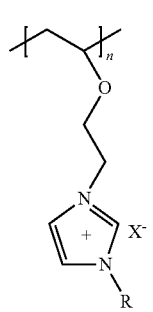
5
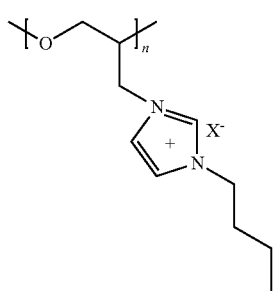
6
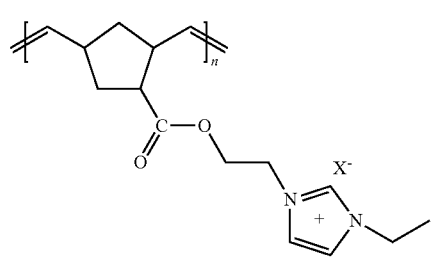
7
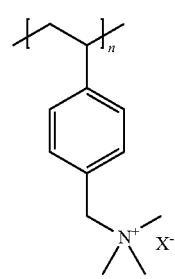
8
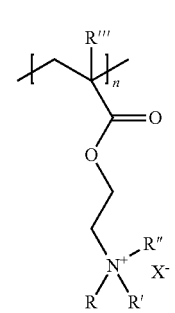
9
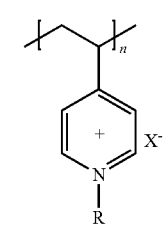
10
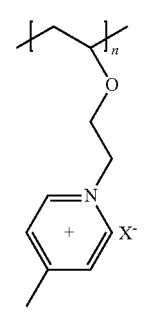
11
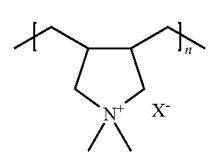
12
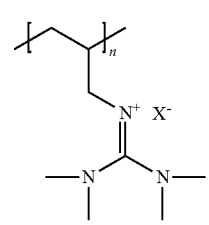

13
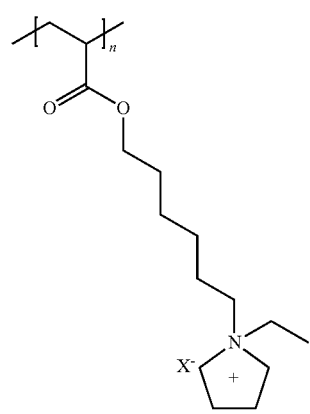
15
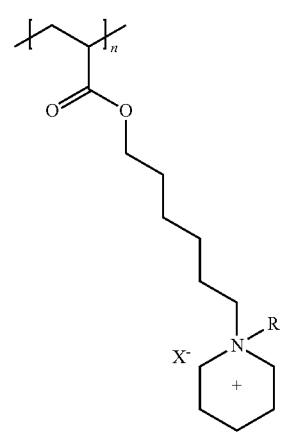
R = H, or alkyl
X' = BF$_4$, PF$_6$, TFSI, CF$_3$SO$_3$, SCN, etc.
16
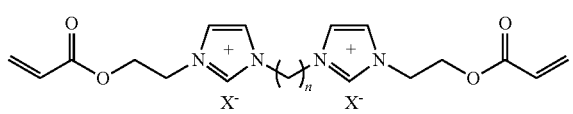
17
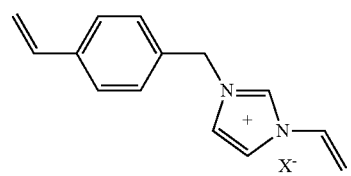
18
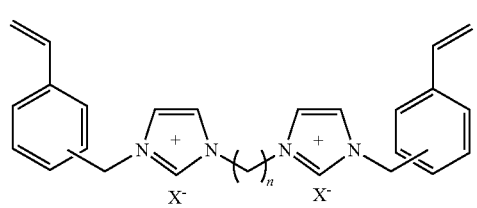
19
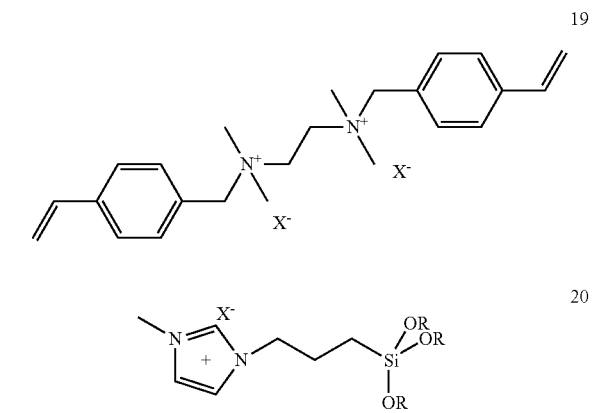
20
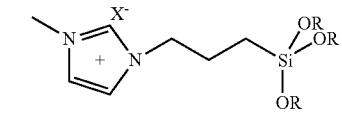
21
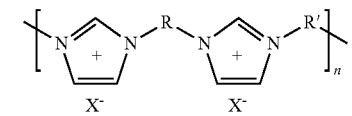
22
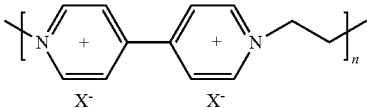
23
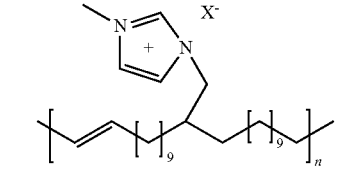
24
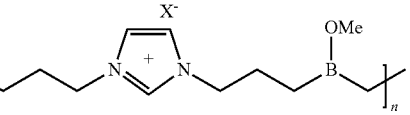
25
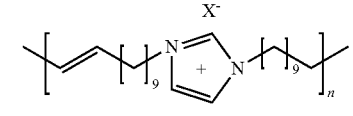
26
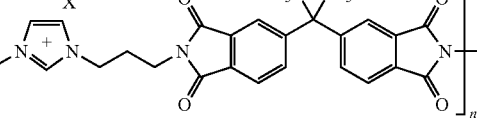
27

-continued
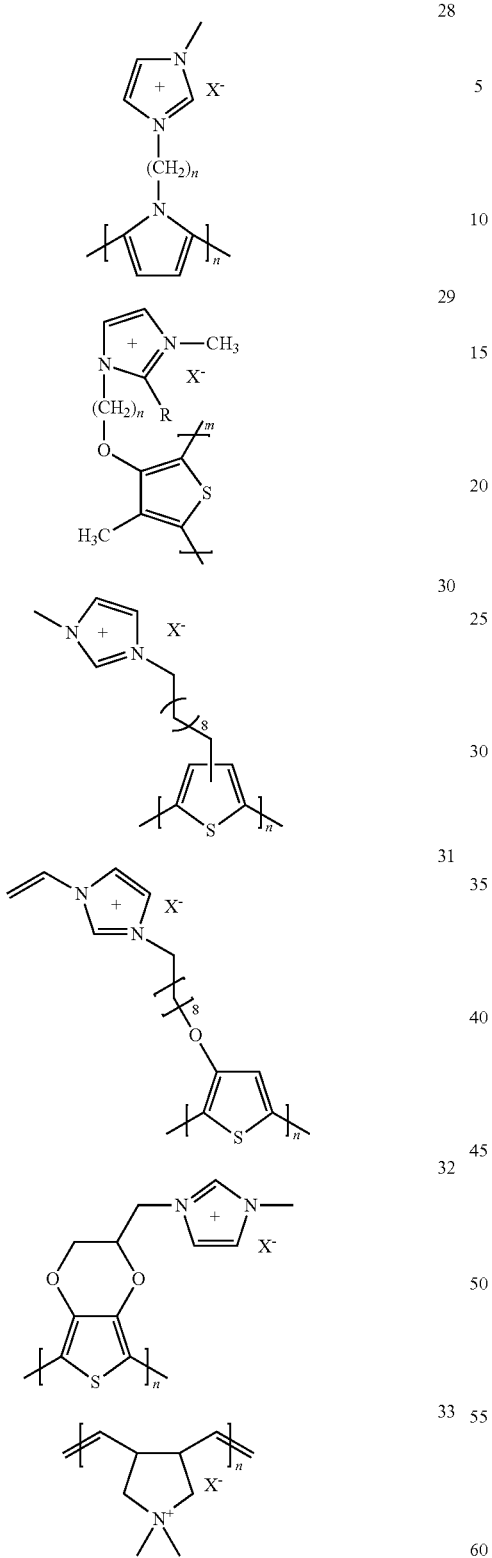
The anionic polymeric liquid includes an anion in its backbone, and a counter ion of the anionic polymeric liquid is a cation, which is not chemically connected to the backbone. For example, the anionic polymeric liquid may have a structure selected from 34 to 41:
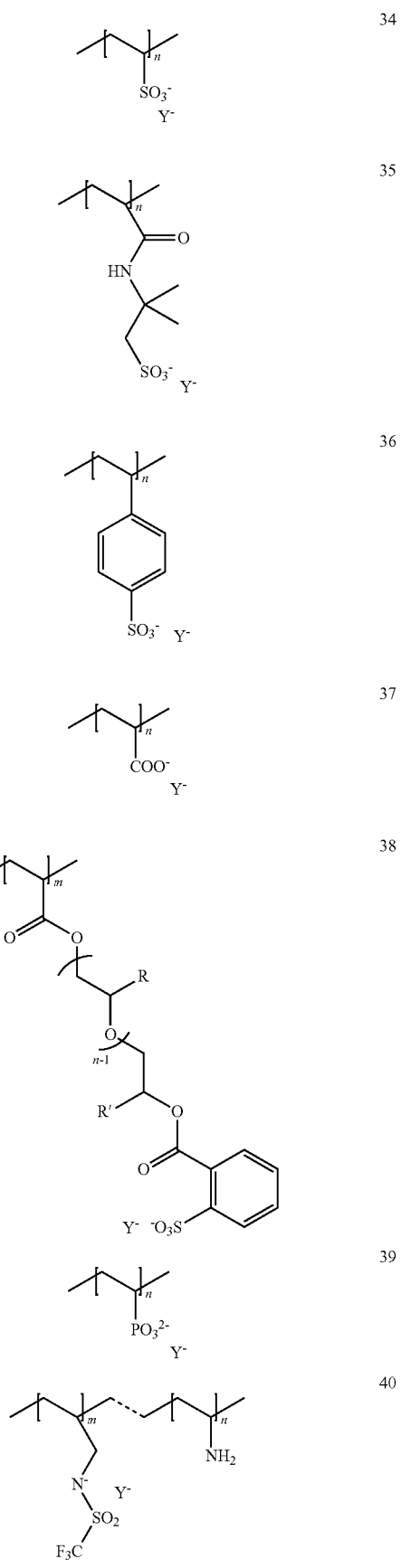

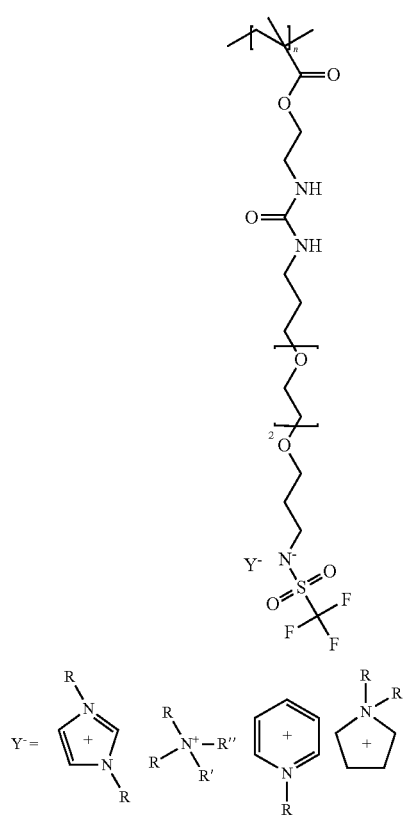

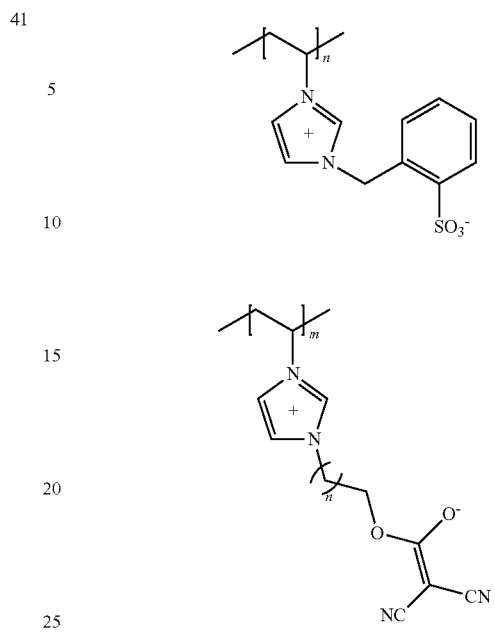

The zwitterionic polymeric ionic liquid includes both a cation and an anion in its backbone, and a counter ion of the zwitterionic polymeric ionic liquid, which is a cation and/or an anion. For example, the zwitterionic polymeric ionic liquid may have a structure selected from structures 42 to 47 below:

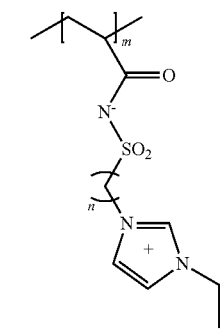

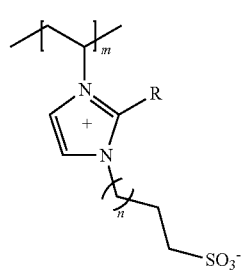

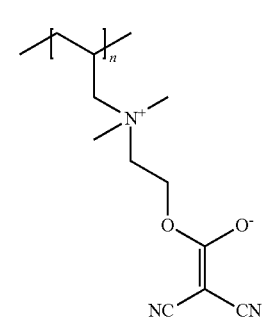

For example, the polymeric ionic liquid in the composite electrolyte may be represented by Formulae 1a and 1b:

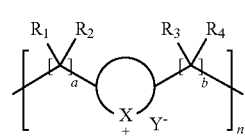

Formula 1a

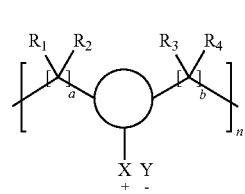

Formula 1b

In Formulae 1a and 1b,

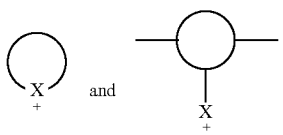

are each independently a 3 to 31 membered group comprising 2 to 30 carbon atoms and optionally at least one heteroatom in addition to X;

X is S, —N($R_5$)($R_6$), —N($R_5$), —P($R_6$), or —P($R_5$)($R_6$);

$R_1$ to $R_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group;

$Y^-$ is an anion;

a and b are each independently an integer of 1 to 5; and n is an integer of 500 to 2,800.

The "3 to 31 membered group comprising a 2 to 30 carbon atoms and optionally at least one heteroatom in addition to X" may be an unsubstituted or substituted heterocyclic ring including 2 to 30 carbon atoms, or an unsubstituted or substituted heteroaryl ring including 2 to 30 carbon atoms, wherein the heteroatom is one selected from a group consisting of N, O, P, and S.

In the composite electrolyte,

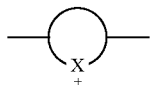

in Formula 1a may be represented by Formula 2:

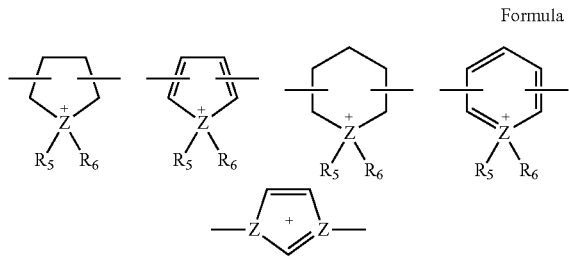

Formula 2

In Formula 2,

Z denotes N, S, or P; and $R_5$ and $R_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 arylthio group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group. When Z denotes S, groups $R_5$ and $R_6$ are absent.

For example, in the composite electrolyte, the polymeric ionic liquid represented by Formula 1a may be a polymeric ionic liquid represented by Formula 3:

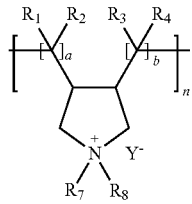

Formula 3

In Formula 3, $R_1$ to $R_8$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group;

$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$;

a and b are each independently an integer of 1 to 5; and n is an integer of 500 to 2800.

For example, in Formula 3, $R_7$ and $R_8$ are each independently C1-C10 alkyl group, $R_1$ to $R_4$ are each independently hydrogen or C1-C10 alkyl group, a and b is 1, and Y– is $BF_4^-$, $PF_6^-$, $ClO_4^-$, $CH_3SO_3^-$, $CF_3CO_2^-$, $(CF_3SO_2)_2N^-$, $CF_3SO_3^-$, $(C_2F_5SO_2)_2N^-$, or $(C_2F_5SO_2)(CF_3SO_2)N^-$.

For example, the polymeric ionic liquid may be poly (diallyldimethylammonium)trifluoromethanesulfonylimide (poly(diallyldimethylammonium)TFSI).

In the composite electrolyte, an organic electrolyte may comprise at least one selected from an organic solvent and an ionic liquid.

For example, the organic solvent may be at least one selected from propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, diethyleneglycol, succinonitrile, and dimethylether, but it is not limited thereto, and any organic solvent available in the art that is stable (does not readily react) with respect to a lithium metal may be used.

For example, the ionic liquid may be represented by Formula 4a, Formula 4b, or Formula 5:

Formula 4a

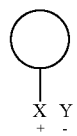

Formula 4b

In Formulae 4a and 4b,

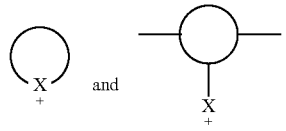

are each independently a 3 to 31 membered group comprising 2 to 30 carbon atoms and optionally at least one heteroatom in addition to X;

X in Formulae 4a and 4b is the same or different from X in Formulae 1a and 1b, and is independently S, —N($R_5$)($R_6$), —N($R_5$), —P($R_6$), or —P($R_5$)($R_6$); and $Y^-$ in Formulae 4a and 4b is an anion, which is the same or different from $Y^-$ in Formulae 1a and 1b.

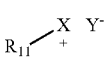

Formula 5

In Formula 5,

X is the same or different from X in Formulae 1a, 1b, 4a, and 4b and is independently —N($R_5$)($R_6$), —N($R_5$), —P($R_6$), or —P($R_5$)($R_6$);

$R_{11}$ is an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group; and $Y^-$ is an anion, which is the same or different from $Y^-$ in Formulae 1a, 1b, 4a, and 4b, and wherein in Formulae 4a, 4b, and 5, $R_5$ and $R_6$ is each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group.

For example,

in Formula 4a may be a cation that is represented by Formula 6, and

in Formula 5 may be a cation that is represented by Formula 7:

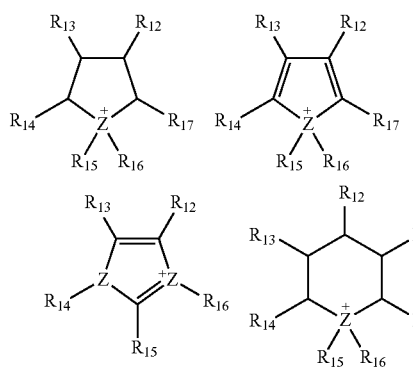

Formula 6

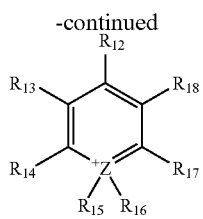

In Formula 6,

Z denotes S, N, or P; and $R_{12}$ to $R_{18}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group, provided that when Z denotes S, groups $R_{15}$ and $R_{16}$ are absent.

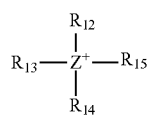

Formula 7

In Formula 7,

Z denotes N or P; and $R_{12}$ to $R_{15}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group.

The ionic liquid included in the organic electrolyte may include at least one cation selected from a pyrrolidinium cation, a pyridinium cation, an imidazolium cation, a piperidinium cation, an ammonium cation, an alkylammonium cation, an alkylphosphonium cation, and an alkylsulfonium cation, and an least one anion selected from bis(trifluoromethylsulfonyl)imide, bis(fluorosulfonyl)imide, bis(pentafluorosulfonyl)imide, bis(oxalate)borate, difluoro(oxalate)borate, bromide, chloride, dicyanamide, hexafluorophosphate, phosphate, sulfate, iodide, sulfonate, nitrate, tetrafluoroborate, thiocyanate, and triflate.

For example, the ionic liquid may be [emim]Cl/AlCl$_3$ (emim=ethyl methyl imidazolium), [bmpyr]NTf$_2$ (bmpyr=butyl methyl pyridinium), [bpy]Br/AlCl$_3$ (bpy=4,4'-bipyridine), [choline]Cl/CrCl$_3$.6H$_2$O, [Hpy(CH$_2$)$_3$pyH][NTf$_2$]$_2$ (NTf=trifluoromethanesulfonimide), [emim]OTf/[hmim]I (hmim=hexyl methyl imidazolium), [choline]Cl/HOCH$_2$CH$_2$OH, [Et$_2$MeN(CH$_2$CH$_2$OMe)]BF$_4$ (Et=ethyl, Me=methyl, Pr=propyl, Bu=butyl, Ph=phenyl, Oct=octyl, Hex=hexyl), [Bu$_3$PCH$_2$CH$_2$C$_8$F$_{17}$]OTf (OTf=trifluoromethane sulfonate), [bmim]PF$_6$ (bmim=butyl methyl imidazolium), [bmim]BF$_4$, [omim]PF$_6$ (omim=octyl methyl imidazolium), [Oct$_3$PC$_{18}$H$_{37}$]I, [NC(CH$_2$)$_3$mim]NTf$_2$ (mim=methyl imidazolium), [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph] NTf$_2$, [pmim][(HO)$_2$PO$_2$] (pmim=propyl methyl imidazolium), [b(6-Me)quin]NTf$_2$ (bquin=butyl quinolinium, [bmim][Cu$_2$Cl$_3$], [C$_{18}$H$_{37}$OCH$_2$mim]BF$_4$ (mim=methyl imidazolium), [heim]PF$_6$ (heim=hexyl ethyl imidazolium), [mim(CH$_2$CH$_2$O)$_2$CH$_2$CH$_2$mim][NTf$_2$]$_2$ (mim=methyl imidazolium), [obim]PF$_6$ (obim=octyl butyl imidazolium), [oquin]NTf$_2$ (oquin=octyl quinolinium), [hmim][PF$_3$(C$_2$F$_5$)$_3$], [C$_{14}$H$_{29}$mim]Br (mim=methyl imidazolium), [Me$_2$N(C$_{12}$H$_{25}$)$_2$]NO$_3$, [emim]BF$_4$, [mm(3-NO$_2$)im][dinitrotriazolate], [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$, but it is not limited thereto, and any ionic liquid available in the art may be used.

The organic electrolyte includes a medium including an organic solvent and/or an ionic liquid, and optionally a lithium salt. The lithium salt is not particularly limited, and any lithium salt available in the art as a lithium salt of a liquid electrolyte may be used. For example, the lithium salt may be LiPF$_6$, LiBF$_4$, LiSbF$_6$, LiAsF$_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (wherein x and y are natural numbers), LiCl, LiI, or a mixture thereof. For example, the lithium salt may be LiPF$_6$.

In the organic electrolyte, a concentration of lithium may be in a range of about 0.01 molar (M) to about 2.0 M, but the concentration range is not limited thereto, and any appropriate concentration according to the need may be used. When a concentration of lithium in the organic electrolyte is within this range, characteristics of the battery including the organic electrolyte may further improve.

According to another embodiment, a lithium battery includes:

a cathode;

an anode; and an electrolyte layer that is disposed on at least a part of the anode, wherein the electrolyte layer includes the composite electrolyte described above.

For example, as shown in FIG. 1, a lithium battery 1 may include a cathode 11; an anode 12; and an electrolyte layer 13 that is disposed on the anode 12. An interlayer 14 may be disposed between the cathode 11 and the electrolyte layer 13. The interlayer 14 may be an electrolyte layer or a separator that has a composition different from that of the electrolyte layer 13.

In the lithium battery, since the composite electrolyte is disposed on at least a part of the anode, a surface of the anode may be electrochemically and mechanically stabilized. Thus, during charging/discharging of the lithium battery, formation of dendrites on the surface of the anode may be suppressed, stability of an interface between the anode and the composite electrolyte may be improved, and current may be evenly distributed on the surface of the anode. As a result, cycle characteristics of the lithium battery may improve. Further, the electrolyte layer may serve as a protecting layer that protects the surface of the anode. For example, since the surface of the anode is completely covered by the electrolyte layer, direct contact of the surface of the anode with other electrolyte, which is disposed between the electrolyte layer including the composite electrolyte and the cathode and has a composition different from that of the composite electrolyte (i.e., has a high reactivity with the surface of the anode), may be prevented. As a result, the anode may be protected, and thus stability of the anode may improve.

In the lithium battery, at least a part of the anode may be coated with the electrolyte layer including the composite electrolyte. That is, the electrolyte layer is not simply physically stacked directly on the anode. Instead, since the electrolyte layer is formed by the coating, the surface of the anode and the electrolyte layer may evenly and tightly contact each other. For example, the electrolyte layer and the anode may be integrated into one body. A method of the coating is not particularly limited, and any coating method available in the art such as bar coating or spin coating may be used to perform coating of the electrolyte layer on the anode. For example, the surface of the anode may be first coated with a composition including the composite electrolyte and then dried at room temperature to form the electrolyte layer.

In the lithium battery, a thickness of the electrolyte layer including the composite electrolyte may be 40 micrometers (μm) or less. For example, in the lithium battery, a thickness of the electrolyte layer including the composite electrolyte may be in a range of about 0.01 μm to about 40 μm. For example, in the lithium battery, a thickness of the electrolyte layer including the composite electrolyte may be in a range of about 0.1 μm to about 40 μm. For example, in the lithium battery, a thickness of the electrolyte layer including the composite electrolyte may be in a range of about 1 μm to about 40 μm. For example, in the lithium battery, a thickness of the electrolyte layer including the composite electrolyte may be in a range of about 1 μm to about 30 μm. For example, in the lithium battery, a thickness of the electrolyte layer including the composite electrolyte may be in a range of about 1 μm to about 20 μm. For example, in the lithium battery, a thickness of the electrolyte layer including the composite electrolyte may be in a range of about 1 μm to about 15 μm. When a thickness of the electrolyte layer is too great (for example, 40 μm or greater), an interface resistance may increase.

For example, in the lithium battery, the anode may include a lithium metal. Also, the anode may further include an alloy of lithium and at least one other metal. The at least one other metal in the alloy may be Si or Sn, but it is not limited thereto, and any metal that may form an alloy with lithium may be used.

In the lithium battery, a thickness of the lithium metal may be less than 100 μm. For example, cycle characteristics of the lithium battery may be stable in spite of having a lithium thin layer with a thickness of less than 100 μm. For example, in the lithium battery, a thickness of the lithium metal may be 80 μm or less. For example, in the lithium battery, a thickness of the lithium metal may be 60 μm or less. For example, in the lithium battery, a thickness of the lithium metal may be 50 μm or less. In a conventional lithium battery, when a thickness of a lithium thin layer decreases to less than 100 μm, lithium becomes deteriorated by side reactions and formation of dendrites, and thus the lithium battery does not provide stable cycle characteristics.

Figure 2:
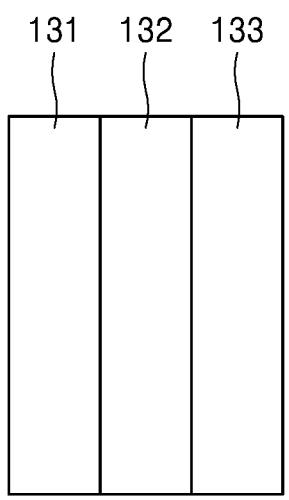
FIG. 2 is a schematic view of a multi-layer structure electrolyte layer according to an embodiment.

In the lithium battery, the electrolyte layer may have a multi-layer structure including two or more layers. For example, as shown in FIG. 2, the electrolyte layer 13 shown in FIG. 1 may have a multi-layer structure including a first layer 131, a second layer 132, and a third layer 133. As shown in FIG. 1, a lithium battery 1 may include a cathode 11; an anode 12; an electrolyte layer 13 including the composite electrolyte disposed on the anode 12; and an interlayer 14 disposed between the cathode 11 and the electrolyte layer 13.

Further, the two or more layers may have different compositions. For example, in FIG. 2, the first layer 131, the second layer 132, and the third layer 133 may have compositions different from each other. For example, the two or more layers may each independently include at least one selected from a liquid electrolyte, a gel electrolyte, and a solid electrolyte. For example, in the multi-layer structure, the third layer 133 shown in FIG. 2 adjacent to the anode 12 shown in FIG. 1 may include the composite electrolyte, the second layer 132 may include a liquid electrolyte, and the first layer 131 may include a solid electrolyte.

Figure 9A:
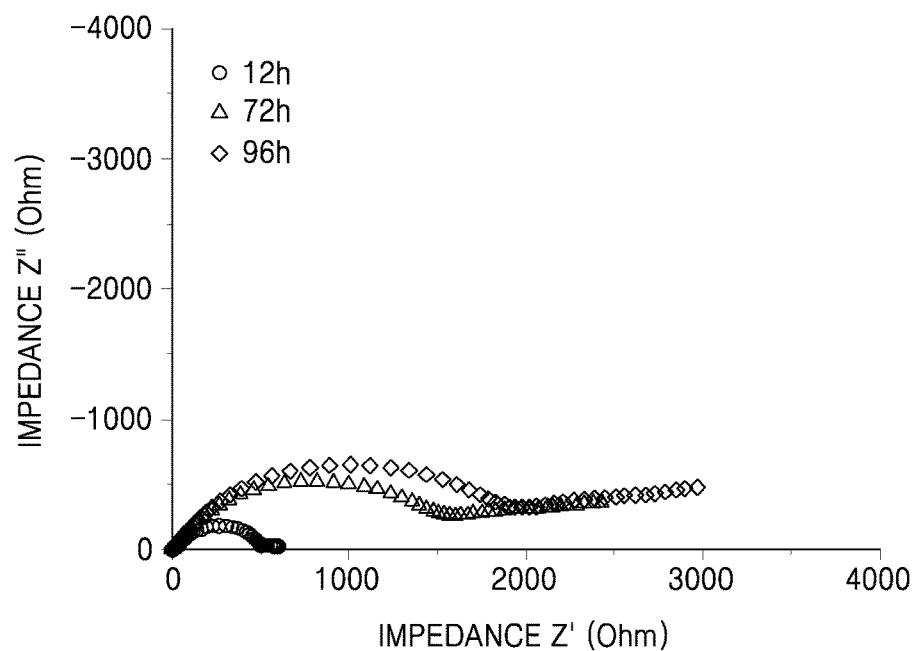
FIG. 9A is a Nyquist plot of impedance Z" (ohm, $\Omega$) versus impedance Z' (ohms, $\Omega$) showing impedance measurement results according to duration time of a lithium battery prepared in Comparative Example 9.
Figure 9B:
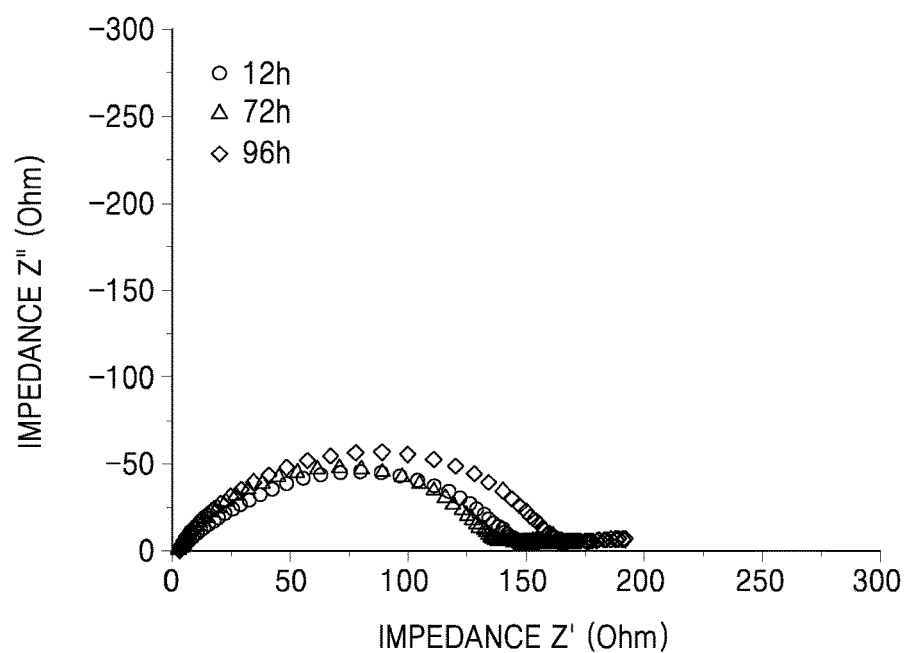
FIG. 9B is a Nyquist plot of impedance Z" (ohms, $\Omega$) versus impedance Z' (ohms, $\Omega$) showing impedance measurement results according to duration time of a lithium battery prepared in Example 9.

For example, as shown in FIGS. 9A and 9B, after 96 hours at 25° C., an impedance (resistance) of the lithium battery having the electrolyte layer, that is disposed on the anode and includes the composite electrolyte, may be about 10% or less compared to that of a lithium battery without the composite electrolyte (i.e., composite electrolyte-free lithium battery). For example, after 96 hours at 25° C., an impedance of a symmetry cell including an electrode prepared by coating a lithium metal with the composite electrolyte may be 10% or less compared to that of a symmetry cell including an electrode prepared by a lithium metal that is not coated with the composite electrolyte. Since the electrolyte including the composite electrolyte is disposed on the anode, the surface of the anode is stabilized, and thus an interface resistance of the anode according to duration time may significantly decrease.

Figure 3:
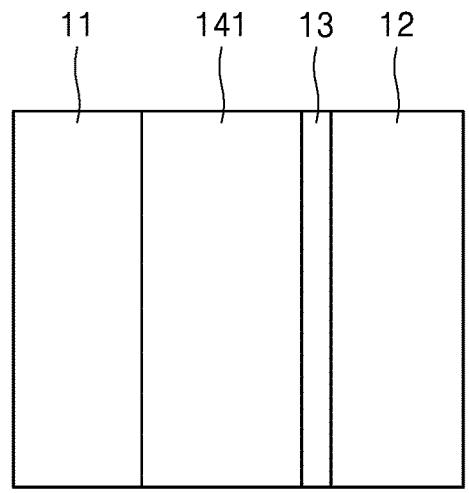
FIG. 3 is a schematic view of a lithium battery according to another embodiment.

The lithium battery may further include a separator disposed between the cathode and the anode. As shown in FIG. 3, a lithium battery may further include a cathode 11; an anode 12; an electrolyte layer 13 including the composite electrolyte disposed on the anode 12; and a separator 141 disposed between the cathode 11 and the electrolyte layer 13. A composition of the separator 141 will be described in detail in the description of a battery preparation method. The separator 141 may be used as impregnated with a liquid electrolyte.

Figure 4:
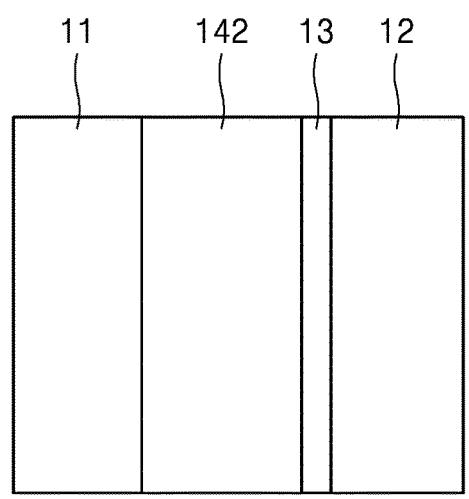
FIG. 4 is a schematic view of a lithium battery according to another embodiment.

The lithium battery may further include a liquid electrolyte adjacent to the cathode. As shown in FIG. 4, a lithium battery may include a cathode 11; an anode 12; an electrolyte layer 13 including the composite electrolyte disposed on the anode 12; and a liquid electrolyte 142 disposed between the cathode 11 and the electrolyte layer 13. A composition of the liquid electrolyte 142 may be identical to or different from a composition of a liquid electrolyte contained in the composite electrolyte of the electrolyte layer 13. The composition of the liquid electrolyte 142 is the same as described above.

Figure 5:
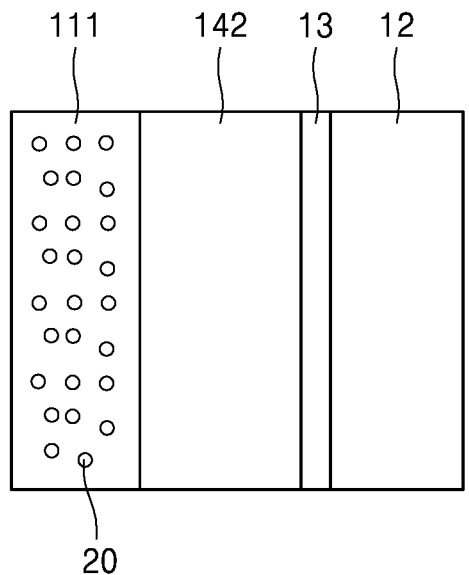
FIG. 5 is a schematic view of a lithium battery according to another embodiment.

In the lithium battery, the cathode may be a porous cathode that is impregnated with a liquid electrolyte. As shown in FIG. 5, a lithium battery may include a porous cathode 111; an anode 12; an electrolyte layer 13 including the composite electrolyte disposed on the anode 12; and a liquid electrolyte 142 disposed between the cathode 11 and the electrolyte layer 13. As used herein, examples of the porous cathode 111 may include a cathode in which a liquid electrolyte may penetrate thereto by capillary phenomenon when formation of pores 20 is not intentionally prevented, as well as a cathode having pores 20 that are intentionally formed therein. That is, examples of the porous cathode 111 may include a cathode having pores 20 that are formed during a preparation process. For example, the porous cathode 111 may include a cathode obtained by coating a cathode active material composition including a cathode active material, a conducting material, a binder, and a solvent on a current collector and drying the composition. The porous cathode 111 obtained from the cathode active material composition may include pores 20 existing between particles of the cathode active material. The porous cathode 111 may be impregnated with the liquid electrolyte 142. As the porous cathode 111 is impregnated with the liquid electrolyte 142, contact between the cathode active material and an electrolyte solution increases, and thus an internal resistance of the lithium battery may decrease.

In the lithium battery, the cathode may include at least one selected from a liquid electrolyte, a gel electrolyte, and a solid electrolyte. In order to improve a lithium ion conductivity, the cathode may include a liquid electrolyte, a gel electrolyte, or a solid electrolyte. The liquid electrolyte, gel electrolyte, and solid electrolyte may be any material that is available as an electrolyte of a lithium battery in the art as long as the material does not react with the cathode active material during charging/discharging process and does not deteriorate the cathode active material. The liquid electrolyte may be identical to a liquid electrolyte with which the porous cathode 111 shown in FIG. 5 is impregnated. The gel electrolyte may be a polymer gel electrolyte. The solid electrolyte may be a solid polymer electrolyte or a solid inorganic ion conductor.

The lithium battery includes:
a cathode;
an anode; and
a composite electrolyte layer including the composite electrolyte adjacent to the cathode, and may include
a solid electrolyte layer disposed on at least a part of the anode.

Figure 6:
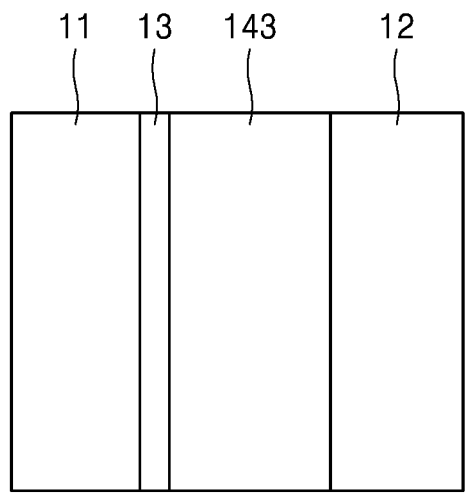
FIG. 6 is a schematic view of a lithium battery according to another embodiment.

As shown in FIG. 6, a lithium battery may include a cathode 11, an anode 12, a composite electrolyte layer 13 adjacent to the cathode 11, and a solid electrolyte layer 143 disposed between the composite electrolyte layer 13 and the anode 12. The composite electrolyte layer 13 may have a multi-layer structure as shown in FIG. 2. For example, the composite electrolyte layer 13 including the composite electrolyte in at least one layer of the first layer 131, the second layer 132, and the third layer 133 of the multi-layer shown in FIG. 2 may be disposed adjacent to the cathode 11.

The solid electrolyte layer 143 may include at least one selected from an ionically conducting polymer, polymeric ionic liquid (PIL), an inorganic electrolyte, a polymer matrix, and an electronically conducting polymer, but it is not limited thereto, and any solid electrolyte available in the art may be used. The polymer matrix may not have an ion conductivity or an electron conductivity.

For example, the solid electrolyte layer 143 may include at least one selected from a polyethyleneoxide (PEO), a solid graft copolymer including two or more polymer blocks having a low Tg, poly(diallyldimethylammonium)trifluoromethanesulfonylimide (poly(diallyldimethylammonium) TFSI), $Cu_3N$, $Li_3N$, LiPON, $Li_3PO_4.Li_2S.SiS_2$, $Li_2S.GeS_2.Ga_2S_3$, $Li_2O.11Al_2O_3$, $Na_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element, such as Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0.1 \leq x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0 < x < 3$, and A is Zn).

For example, the solid electrolyte layer 143 may be an ionically conducting polymer including an ion conductive repeating unit that is at least one selected from an ether monomer, an acryl monomer, a methacryl monomer, and a siloxane monomer.

For example, the ionically conducting polymer may be at least one selected from polyethyleneoxide, polypropyleneoxide, polymethylmethacrylate, polyethylmethacrylate, polydimethylsiloxane, polyacrylic acid, polymethacrylic acid, polymethylacrylate, polyethylacrylate, poly-2-ethyl hexyl acrylate, polybutylmethacrylate, poly-2-ethylhexylmethacrylate, polydecylacrylate, and polyethylenevinylacetate.

For example, the ionically conducting polymer may be a copolymer including an ion conductive repeating unit and a structural repeating unit.

For example, the ion conductive repeating unit may be derived from at least one monomer selected from acrylic acid, methacrylic acid, methyl acrylate, methyl methacrylate, ethylacrylate, ethylmethacrylate, 2-ethylhexylacrylate, butylmethacrylate, 2-ethylhexylmethacrylate, decylacrylate, ethylenevinylacetate, ethylene oxide, and propylene oxide, and the structural repeating unit may be derived from at least one monomer selected from styrene, 4-bromo styrene, tert-butyl styrene, divinylbenzene, methyl methacrylate, isobutyl methacrylate, butadiene, ethylene, propylene, dimethylsiloxane, isobutylene, N-isopropyl acrylamide, vinylidene fluoride, acrylonitrile, 4-methylpentene-1, butylene terephthalate, ethylene terephthalate, and vinyl pyridine.

For example, the ionically conducting polymer may be a block copolymer including an ion conductive phase and a structural phase. Examples of the block copolymer including an ion conductive phase and a structural phase may include block copolymers disclosed in U.S. Pat. No. 8,269,197; U.S. Pat. No. 8,563,168; and U.S. Patent Application Publication No. 2011/0206994, which are incorporated herein in their entirety by reference.

The block copolymer may include a linear block copolymer, a branched block copolymer, or a combination thereof. The block copolymer may have any shape, for example, a lamellar, cylindrical, spherical, ellipsoidal, polyhedral, or gyroid shape, or the like. In an embodiment, the block copolymer may have an irregular shape. The branched block copolymer may be any type of copolymer known to one of ordinary skill in the art. For example, the branched block copolymer can be a stereoblock copolymer, a graft polymer, a star-shaped polymer, a comb polymer, a brush polymer, or a polymer network, without being limited thereto, and any polymer commonly used in the art as the branched block copolymer may also be used.

The block copolymer may include at least one of a linear diblock copolymer A-B and a linear triblock copolymer A-B-A'. The blocks A and A' may be the same or different and may be ion conductive polymer blocks respectively selected from a polyethylene oxide (PEO) block, a polysiloxane block, a polypropylene oxide (PPO) block, a polyethylene oxide-grafted polymethylmethacrylate (PEO-grafted PMMA) block, a polypropylene oxide-grafted polymethylmethacrylate (PPO-grafted PMMA) block, a poly(dialkylsiloxane-co-ethylene oxide block), a poly(dialkylsiloxane-co-propylene oxide) block, and a polysiloxane-grafted PMMA block. The PEO and PPO pendant chains of the PEO-grafted PMMA block, PPO-grafted PMMA block have increased flexibility compared to the original linear PEO and PPO backbones, which may lead to increased segmental motion and ionic conductivity of the block copolymer. In the poly(dimethyl siloxane-co-ethylene oxide) block and the poly(dialkylsiloxane-co-propylene oxide) block, the siloxane units increase flexibility while the ethylene or propylene oxide units provide coordinating sites for lithium salts. The block B may be a non-conducting polymer block selected from a polystyrene (PS) block, a PMMA block, a polyvinylpyridine block, a polyimide block, a polyethylene block, a polypropylene block, a polyvinylidene fluoride (PVDF) block, a polyacrylonitrile (PAN) block, and a polydimethylsiloxane (PDMS) block.

The block copolymer may also include a linear tetrablock copolymer A-B-A'-B'. In the tetrablock copolymer, the blocks A and A' may be the same or different and may be ion conductive polymer blocks and the blocks B and B' may be the same or different and may be non-conducting polymer blocks. Ion conductive blocks A, A' and non-conducting blocks B and B' may be selected from the same polymer blocks as described above with regard to the triblock copolymer A-B-A'.

A lithium battery including the composite electrolyte may be prepared as follows. For example, as shown in FIG. 4, the lithium battery including the cathode 11; the anode 12; the electrolyte layer 13 including the composite electrolyte disposed on the anode; and a liquid electrolyte 142 disposed between the cathode 11 and the electrolyte layer 13 may be prepared as follows. Also, a separator may be additionally disposed between the cathode 11 and the electrolyte layer 13.

First, an anode is prepared.

As the anode, a lithium metal thin layer may be used by itself. Alternatively, the anode may include a current collector and an anode active material layer disposed on the current collector. For example, the anode used as the lithium metal thin layer may be disposed on a conductive substrate, which is the current collector. The lithium metal thin layer may be integrated with the current collector.

In the anode, the current collector may be one selected from a stainless steel, copper, nickel, iron, and cobalt, but it is not limited thereto, and any metallic substrate that has excellent conductivity and is available in the art may be used. Examples of the current collector may include a conductive oxide substrate and a conductive polymer substrate. Also, the current collector may have various structures, for example, a type having one surface of an insulating substrate coated with a conductive material, a conductive metal oxide or a conductive polymer, in addition to a structure of the whole substrate formed of a conductive material. The current collector may be a flexible substrate. Thus, the current collector may be easily bent. Also, after bending, restoration to its original shape of the current collector may be easy.

Also, the anode may further include an anode active material other than a lithium metal. The anode may be an alloy of a lithium metal and other anode active material, a complex of a lithium metal and other anode active material, or a mixture of a lithium metal and other anode active material.

The other anode active material that may be included in the anode may be, for example, at least one selected from a lithium alloyable metal, a transition metal oxide, a non-transition metal oxide, and a carbonaceous material.

Examples of the lithium alloyable metal may include Si, Sn, Al, Ge, Pb, Bi, Sb, a Si—Y alloy (wherein Y is an alkaline metal, an alkaline earth metal, a group 13 element, a group 14 element, a transition metal, a rare earth element, or a combined element thereof, and is not Si), or a Sn—Y alloy (wherein Y is an alkaline metal, an alkaline earth metal, a group 13 element, a group 14 element, a transition metal, a rare earth element, or a combined element thereof, and is not Sn). Examples of the element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include a lithium titanium oxide, a vanadium oxide, or a lithium vanadium oxide.

Examples of the non-transition metal oxide may include $SnO_2$ or $SiO_x$ (wherein $0<x<2$).

The carbonaceous material may be crystalline carbon, amorphous carbon, or a mixture thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, or fired coke.

Alternatively, the anode may include other conventional anode active material instead of the lithium metal. The anode may be prepared by using an anode active material composition including a conventional anode active material, a conducting material, a binder, and a solvent that are generally used in the art, instead of the lithium metal.

For example, after preparing the conventional anode active material composition, a current collector is directly coated with the anode active material composition to form an anode plate, or the anode active material composition may be cast on a separate support to form an anode active material film, which is then separated from the support and laminated on a current collector to prepare an anode plate. The anode is not limited to a type described above, and any type of anode available in the art may be used. For example, the anode may be prepared by printing anode active material ink including a general anode active material or a general electrolyte on a current collector by using an additional inkjet method.

The conventional anode active material may be a powder. The powder form of the anode active material may be used in an anode active material composition or an anode active material ink.

Examples of the conducting material may include carbon black or graphite particulates, but they are not limited thereto, and any conducting material available in the art may be used.

Examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, or a styrene butadiene rubber polymer, but they are not limited thereto, and any binder available in the art may be used.

Examples of the solvent may include N-methyl-pyrrolidone (NMP), acetone, and water, but they are not limited thereto, and any solvent available in the art may be used.

The amounts of the general anode active material, the conducting material, the binder, and the solvent are those levels that are generally used in the manufacture of a lithium battery. Depending on the use or structure of the lithium battery, one or more of the conducting material, the binder, and the solvent may be omitted.

Next, a composite electrolyte composition is prepared.

The composite electrolyte composition may be prepared by adding and mixing inorganic particles and a liquid electrolyte in a solution including an ionic liquid polymer. The polymeric ionic liquid, inorganic particles, and liquid electrolyte that may be used in the preparation of the composite electrolyte may be as follows. Examples of the composite electrolyte composition may be prepared by adding and mixing poly(diallyldimethylammonium)TFSI and alumina ($Al_2O_3$) in a dimethylformamide (DMF) solvent and a liquid electrolyte, in which 1.3 M of $LiPF_6$ is dissolved, in a mixture solvent including ethylene carbonate (EC), diethyl carbonate (DEC), and fluoroethylene carbonate (FEC) at a volume ratio of 2:6:2.

An anode is coated with the composite electrolyte composition thus prepared, dried at room temperature to remove the solvent (DMF), and thus the anode coated with a composite electrolyte layer may be obtained.

Next, a cathode may be prepared as follows.

A cathode active material composition may be prepared in the same manner as the anode active material composition, except that a cathode active material is used instead of the anode active material.

In the cathode active material composition, a conducting material, a binder, and a solvent may be the same as those defined in connection with the anode active material composition. The cathode active material composition is prepared by mixing the cathode active material, the conducting material, the binder, and the solvent. An aluminum current collector is directly coated with the cathode active material composition and dried to prepare a cathode plate on which a cathode active material layer is formed. Alternatively, the cathode active material composition may be cast on a separate support, and then a film separated from the support may be laminated on the aluminum current collector to prepare a cathode plate on which a cathode active material layer is formed.

The cathode active material is a lithium-containing metal oxide which may be any available in the art. For example, at least one type of a composite oxide of lithium and a metal selected from cobalt, manganese, nickel, and a combination thereof, and examples of the composite oxide may include a compound represented by one of the following chemical formulae: $Li_aA_{1-b}B'_bD'_2$ (wherein $0.90 \leq a \leq 1.8$, and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is nickel (Ni), cobalt (Co), manganese (Mn), or a combinations thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combinations thereof.

Examples of the cathode active material may include $LiCoO_2$, $LiMn_xO_{2x}$ (wherein x is 1 or 2), $LiNi_{1-x}Mn_xO_{2x}$ (wherein $0<x<1$), $Ni_{1-x-y}Co_xMn_yO_2$ (wherein $0 \leq x \leq 0.5$, and $0 \leq y \leq 0.5$), and $LiFePO_4$.

A surface of the compound may have a coating layer or the compound and a compound having a coating layer may be used as a mixture. The coating layer may include a compound of a coating element such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may be Mg, Al, Co, K, Na, Ca, Si, Ti, V, Sn, Ge, Ga, B, As, Zr, or a mixture thereof. A formation process of the coating layer may be any coating method that does not negatively affect physical properties of the cathode active material by using the elements above, and the coating method may be well understood by those of ordinary skill in the art, so the description of the coating method is omitted in the present specification.

The amounts of the general cathode active material, the conducting material, the binder, and the solvent are the amounts that are generally used in the manufacture of a lithium battery.

Next, a separator to be disposed between the cathode and the anode is prepared.

The separator for the lithium battery may be any separator that is commonly used in lithium batteries. The separator may have low resistance to migration of ions in an electrolyte and have an excellent electrolyte-retaining ability. For example, the separator may be selected from glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, an electrode is directly coated with the separator composition, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. For example, the polymer resin may be a vinylidenefluoride/hexafluoropropylene copolymer, polyvinylidene fluoride (PVDF), polyacrylonitrile, polymethylmethacrylate, or a mixture thereof.

Next, a liquid electrolyte is prepared.

For example, an organic electrolyte solution is prepared. The organic electrolyte solution may be prepared by dissolving a lithium salt in an organic solvent.

The organic solvent may be any appropriate solvent available as an organic solvent in the art. For example, the organic solvent may be propylene carbonate, ethylene carbonate, fluoroethylene carbonate, vinylethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethyl formamide, dimethylacetamide, dimethylsulfoxide, dioxane, 1,2-dimethoxyethane, sulfolane, dichloroethane, chlorobenzene, nitrobenzene, dimethyl carbonate, methylisopropyl carbonate, succinonitrile, diethylglycol dimethylether, tetraethyleneglycol dimethylether, triethylglycol dimethylether, polyethylglycol dimethylether, ethylpropyl carbonate, dipropyl carbonate, dibutyl carbonate, diethyleneglycol, dimethylether, or mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof.

Figure 7:
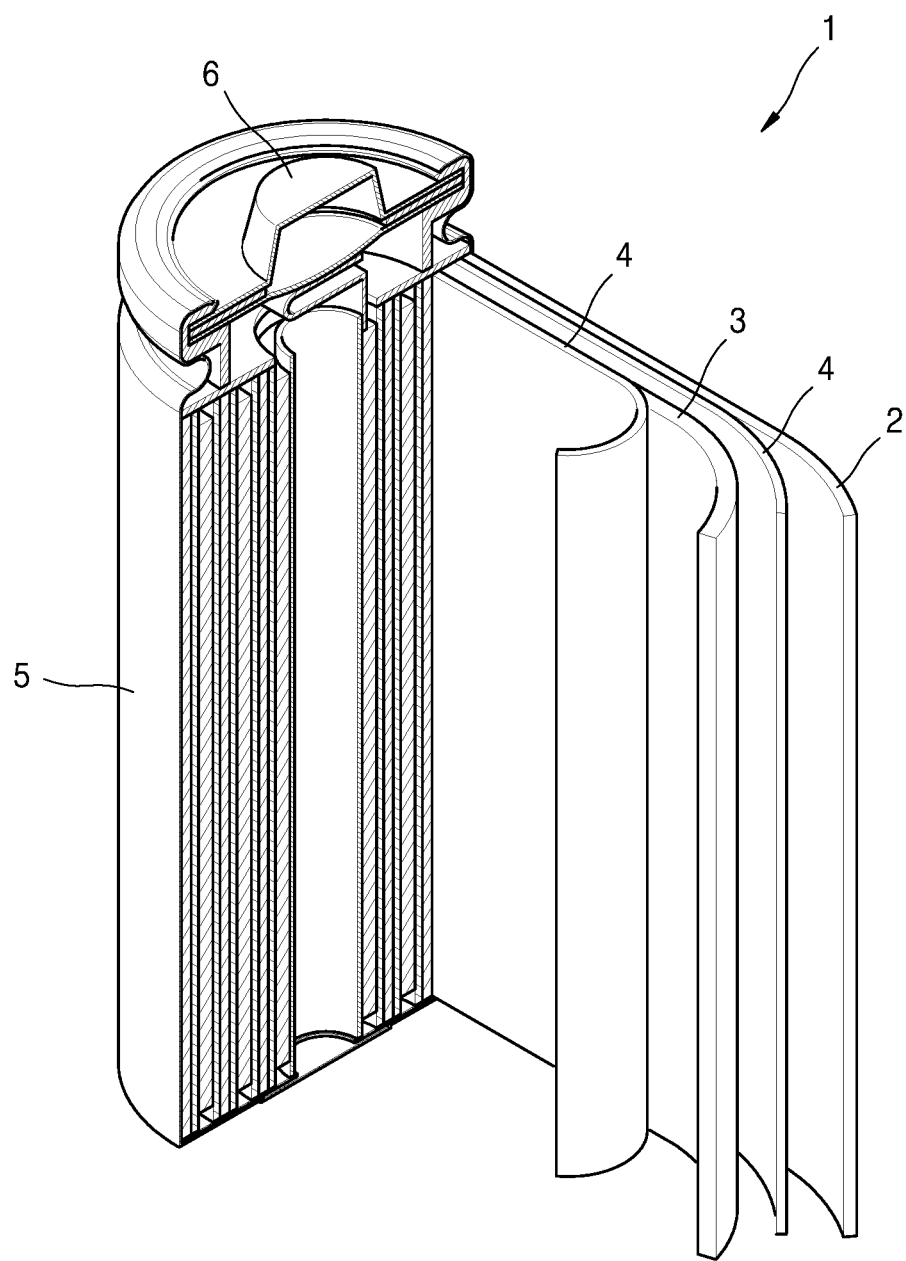
FIG. 7 is a schematic view of a lithium battery according to another embodiment.

For example, as shown in FIG. 7, a lithium battery 1 includes a cathode 3, an anode 2, and a separator 4. The cathode 3, the anode 2 and the separator 4 are wound or folded, and then accommodated in a battery case 5. Then, the battery case 5 is filled with an organic electrolyte solution and sealed with a cap assembly 6, thereby completing manufacture of the lithium battery 1. Although not shown in the drawing, an electrolyte layer including a composite electrolyte is formed on the anode 2. The battery case 5 may be a cylindrical type, a rectangular type, or a thin-film type. For example, the lithium battery 1 may be a thin-film type battery. The lithium battery 1 may be a lithium ion battery.

The separator may be interposed between the cathode and the anode to form a battery assembly. Alternatively, the battery assembly may be stacked in a bi-cell structure and impregnated with the electrolyte solution. The resultant is placed into a pouch and hermetically sealed, thereby completing manufacture of a lithium ion polymer battery.

Alternatively, a plurality of battery assemblies may be stacked to form a battery pack, which may be used in any device that requires high capacity and high output, for example, in a laptop computer, a smart phone, or an electric vehicle (EV).

The lithium battery is not particularly limited to a lithium ion battery or a lithium polymer battery and may include a lithium air battery or a lithium all-solid battery.

Hereinafter are definitions of substituents used in the chemical formulae.

The term "alkyl" as used herein a chemical formula refers to a group derived from a fully saturated branched or non-branched (or straight chain or linear) hydrocarbon group.

Examples of the "alkyl" include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethyl pentyl, and n-heptyl.

At least one hydrogen atom in the "alkyl" may be substituted with a halogen atom, a C1-C20 alkyl group (e.g.: $CCF_3$, $CHCF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, or a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" as used herein in a chemical formula includes fluorine, bromine, chlorine, and iodine.

The term "a C1-C20 alkyl group substituted with a halogen atom" as used herein in a chemical formula refers to a C1-C20 alkyl group that is substituted with at least one halogen atom. Examples of the "C1-C20 alkyl group substituted with a halogen atom" include monohaloalkyl or polyhaloalkyl including dihaloalkyl or perhaloalkyl. The monohaloalkyl includes one iodine, bromine, chlorine, or fluorine in the alkyl group, and dihaloalkyl or polyhaloalkyl denotes an alkyl group having at least two halogen atoms that are identical to or different from each other.

The term "heteroalkyl" as used herein in a chemical formula refers to an alkyl group as defined above in which at least one carbon atom is replaced with a heteroatom selected from nitrogen (N), oxygen (O), phosphorus (P), or sulfur (S) and having carbon as remaining cyclic atoms. Examples of the heteroalkyl may be methylthio, methoxymethyl, dimethylamino group, and the like.

The term "alkoxy" as used herein a chemical formula refers to "alkyl-O—", wherein the term "alkyl" has the same meaning as described above. Examples of the alkoxy include methoxy, ethoxy, n-propoxy, iso-propoxy, n-butoxy, iso-butoxy, sec-butoxy, tert-butoxy, pentyloxy, and hexyloxy. In the alkoxy group, at least one hydrogen atom may be substituted with the same groups as described above in connection with the alkyl group.

The term "alkoxyalkyl" as used herein a chemical formula refers to an alkyl group substituted with the alkoxy group described above. At least one hydrogen atom of the alkoxyalkyl may be substituted with the same groups as described above in connection with the alkyl group. The term "alkoxyalkyl" includes an alkoxyalkyl moiety.

The term "alkenyl" as used herein a chemical formula refers to a branched or non-branched hydrocarbon having at least one carbon-carbon double bond. Examples of the alkenyl group include vinyl, allyl, butenyl, iso-propenyl, and iso-butenyl. At least one hydrogen atom of the alkenyl group may be substituted with the same groups as described above in connection with the alkyl group.

The term "alkynyl" as used herein a chemical formula refers to a branched or non-branched hydrocarbon having at least one carbon-carbon triple bond. Examples of the alkynyl group include ethynyl, butynyl, iso-butynyl, and iso-propynyl.

At least one hydrogen atom of the alkynyl group may be substituted with the same groups as described above in connection with the alkyl group.

The term "aryl" as used herein a chemical formula refers to an aromatic hydrocarbon that may be used alone or in a combination and includes at least one ring.

The term "aryl" includes a group, wherein an aromatic ring is fused with one or more cycloalkyl rings. Examples of the aryl may be phenyl, naphthyl, and tetrahydronaphthyl. Also, at least one hydrogen atom in the aryl group may be substituted with the same groups as described above in connection with the alkyl group.

The term "arylalkyl" as used herein a chemical formula refers to an alkyl group substituted with an aryl group. Examples of the arylalkyl include benzyl and phenyl-$CH_2CH_2$—.

The term "aryloxy" as used herein a chemical formula refers to O-aryl, and examples of the aryloxy group include phenoxy. At least one hydrogen atom in the aryl group may be substituted with the same groups as described above in connection with the alkyl group.

The term "arylthio" as used herein in a chemical formula refers to aryl-S—, wherein the aryl group is as described above. Examples of the arylthio may be phenylthio, naphthylthio, tetrahydronaphthylthio group, and the like.

The term "heteroaryl" as used herein a chemical formula refers to a monocyclic or bicyclic organic compound including at least one heteroatom selected from nitrogen (N), oxygen (O), phosphorus (P), and sulfur (S), and the remaining ring atoms are carbon (C). For example, the heteroaryl group may include 1 to 5 heteroatoms and may include 5 to 10 ring members, wherein S or N may be present in various oxidation states. Examples of heteroaryl group include pyridyl, pyrrolyl, pyrimidinyl, and imidazolyl.

At least one hydrogen atom in the heteroaryl group may be substituted with the same groups as described above in connection with the alkyl group.

The term "heteroarylalkyl" as used herein a chemical formula refers to an alkyl group substituted with heteroaryl.

The term "heteroaryloxy" as used herein a chemical formula refers to a O-heteroaryl moiety. At least one hydrogen atom in the heteroaryloxy group may be substituted with the same groups as described above in connection with the alkyl group.

The term "heteroarylthio group" as used in a chemical formula refers to an heteroaryl-S moiety. Examples of the heteroarylthio may be 2-pyridylthio and the like.

The term "heteroaryloxyalkyl" as used herein a chemical formula denotes an alkyl group substituted with heteroaryloxy. At least one hydrogen atom in the heteroaryloxyalkyl group may be substituted with the same groups as described above in connection with the alkyl group.

The term "cycloalkyl" or "carbon ring" as used herein a chemical formula refers to a saturated or partially unsaturated non-aromatic monocyclic, bicyclic, or tricyclic hydrocarbon group.

Examples of the monocyclic hydrocarbon group include cyclopentyl, cyclopentenyl, cyclohexyl, and cyclohexenyl, and examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

Examples of the tricyclic hydrocarbon include adamantyl.

At least one hydrogen atom in the "carbon ring" may be substituted with the same groups as described above in connection with the alkyl group.

The term "cycloalkyloxy" as used herein a chemical formula refers to "cycloalkyl-O—", wherein the term "cycloalkyl" has the same meaning as described above.

Examples of the cycloalkyloxy may be cyclopropyloxy, and cyclohexyloxy. In the cycloalkyloxy group, at least one hydrogen atom may be substituted with the same groups as described above in connection with the alkyl group.

The term "a heterocyclic ring" group, or a "heterocycloalkyl" group as used herein a chemical formula refers to a ring group composed of 5 to 10 atoms containing a heteroatom, such as nitrogen (N), sulfur (S), phosphor (P), or oxygen (O). An example of the heterocyclic ring group is piperidine. At least one hydrogen atom in the "heterocyclic ring group" or the "heterocycloalkyl group" may be substituted with the same groups as described above in connection with the alkyl group.

The term "heterocyclicoxy" or "heterocycloxy" as used herein a chemical formula denotes a O-heterocyclic ring or a O-heterocycloalkyl group, and at least one hydrogen atom in the "heterocyclicoxy" group or the "heterocycloxy" group may be substituted with the same groups as described above in connection with the alkyl group.

Hereinafter, one or more embodiments will be described in detail with reference to the following examples. However, these examples are not intended to limit the scope of the one or more embodiments.

Preparation of Composite Electrolyte

Preparation Example 1: Preparation of Polymeric Ionic Liquid

A solution prepared by dissolving 8.52 grams (g) of lithium bis(trifluoromethanesulfonyl)imide (LiTFSi) in 10 milliliters (ml) of distilled water, and a solution prepared by 4 g of poly(diallyldimethylammonium) chloride (available from Aldrich, #409022, a weight average molecular weight in a range of about 200,000 to about 350,000, 20 percent by weight (wt %) in water) represented by Formula 12 in 100 ml of distilled water were placed together in a 250 ml-round bottom flask. The reaction mixture was stirred at room temperature (20° C.) for about 1 hour to form a precipitate of white crystals. The white crystals thus obtained were filtered, and dried in a vacuum oven at 105° C. to obtain poly(diallyldimethylammonium)TFSI represented by Formula 11. A yield of poly(diallyldimethylammonium)TFSI was about 93.5% by weight.

Formula 11

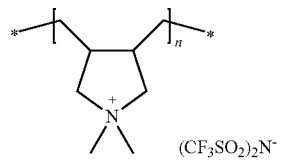

In Formula 11, n was about 2,500.

Formula 12

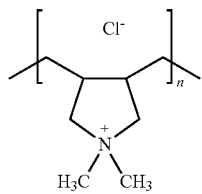

In Formula 12, n was about 2,500.

Example 1

Preparation of Composite Electrolyte and Anode

Poly(diallyldimethylammonium)TFSI represented by Formula 11 prepared in Preparation Example 1, alumina (Al$_2$O$_3$) particles having an average particle diameter of 10 nanometers (nm) (available from Nanoamor, 10 nm, 99% purity, 160 square meters per gram (m$^2$/g), Lot #1041-070510), and a liquid electrolyte (in which 1.3 molar (M) LiPF$_6$ was dissolved in a mixture solvent of EC (ethylene carbonate):DEC (diethyl carbonate):FEC (fluoroethylene carbonate) at a volume ratio of 2:6:2) were added at a weight ratio of 2:3:3 to dimethylformamide (DMF) to obtain a 10 wt % poly(diallyldimethylammonium)TFSI solution. The solution was then stirred at room temperature (20° C.) for about 1 hour to prepare a composition for forming a composite electrolyte. A lithium metal thin film having a thickness of 40 micrometers (μm) on a copper current collector was coated with the composition by using a doctor blade, dried at a high temperature (40° C.), and vacuum dried at room temperature (20° C., 12 hours) to prepare an anode having a structure including an composite electrolyte layer at a thickness of 15 μm coated on the lithium metal. A content of alumina in the composite electrolyte layer was about 60 wt % based on the total weight of the alumina and the polymeric ionic liquid.

Example 2

An anode was prepared in the same manner as in Example 1, except that a composition ratio of the composition for forming a composite electrolyte was changed so that an amount of the alumina in the composite electrolyte layer was about 30 wt % based on the total weight of the alumina and the polymeric ionic liquid.

Example 3

An anode was prepared in the same manner as in Example 1, except that a composition ratio of the composition for forming a composite electrolyte was changed so that an amount of the alumina in the composite electrolyte layer was about 90 wt % based on the total weight of the alumina and the polymeric ionic liquid.

Example 4

An anode was prepared in the same manner as in Example 1, except that alumina (Al$_2$O$_3$) particles having an average particle diameter of 30 nm (available from Dittotechnology, DT-SIO-N50S) was used instead of alumina (Al$_2$O$_3$) particles having an average particle diameter of 10 nm (available from Nanoamor, 10 nm, 99% purity, 160 m$^2$/g, Lot #1041-070510), and a composition ratio of the composition for forming a composite electrolyte was changed so that an amount of the alumina in the composite electrolyte layer was about 40 wt % based on the total weight of the alumina and the polymeric ionic liquid.

Comparative Example 1: Electrolyte without Inorganic Particles

An anode was prepared in the same manner as in Example 1, except that inorganic particles (Al$_2$O$_3$) are not added.

Specifically, the anode was prepared in the same manner as in Example 1, except that poly(diallyldimethylammonium)TFSI represented by Formula 12 prepared in Preparation Example 1 and a liquid electrolyte (in which 1.3 M LiPF$_6$ was dissolved in a mixture solvent of EC (ethylene carbonate):DEC (diethyl carbonate):FEC (fluoroethylene carbonate) at a volume ratio of 2:6:2) were added at a weight ratio of 2:3 to dimethylformamide (DMF) to obtain a 10 wt % poly(diallyldimethylammonium)TFSI solution.

Comparative Example 2: Electrolyte without Organic Solvent and Inorganic Particles An anode was prepared in the same manner as in Example 1, except that inorganic particles (Al$_2$O$_3$) were not added, and only a lithium salt was added instead of the liquid electrolyte.

Specifically, the anode was prepared in the same manner as in Example 1, except that poly(diallyldimethylammonium)TFSI represented by Formula 12 prepared in Preparation Example 1 and a lithium salt (LiPF$_6$) were added at a molar ratio of 18:1, based on monomer (a repeating unit) of the polymeric ionic liquid and lithium salt, to dimethylformamide (DMF) to obtain a 10 wt % poly(diallyldimethylammonium)TFSI solution.

Comparative Example 3: Free of Polymeric Ionic Liquid

An anode was prepared in the same manner as in Example 1, except that the polymeric ionic liquid was not added. However, an electrolyte layer was not formed on the lithium metal thin layer.

Comparative Example 4: Using General Ion Conductive Polymer

An anode was prepared in the same manner as in Example 1, except that polyethyleneoxide (PEO) was used instead of the polymeric ionic liquid.

Preparation of Half Cell

Example 5

Each of a copper current collector and an SUS current collector was coated with the composition prepared in Example 1 by using a doctor blade, dried at a high temperature (40° C.), and vacuum dried at room temperature (25° C., 12 hours) to prepare an electrode having a structure including an composite electrolyte layer at a thickness of 15 μm coated on each of the current collectors. A content of alumina in the composite electrolyte layer was about 60 wt % based on the total weight of the alumina and the polymeric ionic liquid.

The prepared electrode was used as a working electrode, the copper current collector and the SUS current collector coated with each of the lithium metal thin layers was used as a counter electrode, a polypropylene separator (Celgard® 3501) was used as a separator, and a solution in which 1.3 M LiPF$_6$ is dissolved in a mixture solvent of EC (ethylene carbonate)+DEC (diethylene carbonate)+FEC (fluoroethylene carbonate) (at a volume ratio of 2:6:2) was used as an electrolyte to prepare a coin cell.

Examples 6 to 8

Lithium batteries were prepared in the same manner as in Example 5, except that the compositions prepared in Examples 2 to 4 were each respectively used instead of the composition prepared in Example 1.

Comparative Examples 5 to 8

Lithium batteries were prepared in the same manner as in Example 5, except that the compositions prepared in Comparative Examples 1 to 4 were each respectively used instead of the composition prepared in Example 1.

Preparation of Symmetry Cell

Example 9

The electrodes prepared in Example 1 were each used as a working electrode, a polypropylene separator (Celgard® 3501) was used as a separator, and a solution in which 1.3 M $LiPF_6$ is dissolved in a mixture solvent of EC (ethylene carbonate)+DEC (diethylene carbonate)+FEC (fluoroethylene carbonate) (at a volume ratio of 2:6:2) was used as an electrolyte to prepare a coin cell (a symmetry cell).

Examples 10 to 12

Symmetry cells were prepared in the same manner as in Example 9, except that the electrodes prepared in Examples 2 to 4 were each respectively used instead of the electrode prepared in Example 1.

Comparative Examples 9 to 12

Symmetry cells were prepared in the same manner as in Example 9, except that the electrodes prepared in Comparative Examples 1 to 4 were each respectively used instead of the electrode prepared in Example 1.

Preparation of Full Cell

Example 13

The anode prepared in Example 1, a cathode including $LiCoO_2$ as a cathode active material, a polypropylene separator (Celgard® 3501) as a separator, and a solution in which 1.3 M $LiPF_6$ is dissolved in a mixture solvent of EC (ethylene carbonate)+DEC (diethylene carbonate)+FEC (fluoroethylene carbonate) (at a volume ratio of 2:6:2) as an electrolyte were used to prepare a coin cell.

The cathode was prepared as follows.

A $LiCoO_2$ powder and a carbon conducting material (Super-P; Timcal Ltd.) were homogenously mixed at a weight ratio of about 90:5, a polyvinylidene fluoride (PVDF) binder solution was added thereto, to prepare a cathode active material slurry having an active material: carbon conducting material:binder at a weight ratio of 90:5:5.

An aluminum foil having a thickness of 15 μm was coated with the cathode active material slurry, and the slurry was dried to prepare a cathode.

Examples 14 to 16

Lithium batteries were prepared in the same manner as in Example 13, except that the anodes prepared in Examples 2 to 4 were each respectively used instead of the anode prepared in Example 1.

Comparative Examples 13 to 16

Lithium batteries were prepared in the same manner as in Example 13, except that the anodes prepared in Comparative Examples 1 to 4 were each respectively used instead of the anode prepared in Example 1.

In the lithium battery of Comparative Example 16, the electrolyte layer swelled when the composite electrolyte layer contacted the liquid electrolyte on the lithium metal thin film in the anode prepared in Comparative Example 4.

Evaluation Example 1: Evaluation of Electrochemical Stability

Figure 8A:
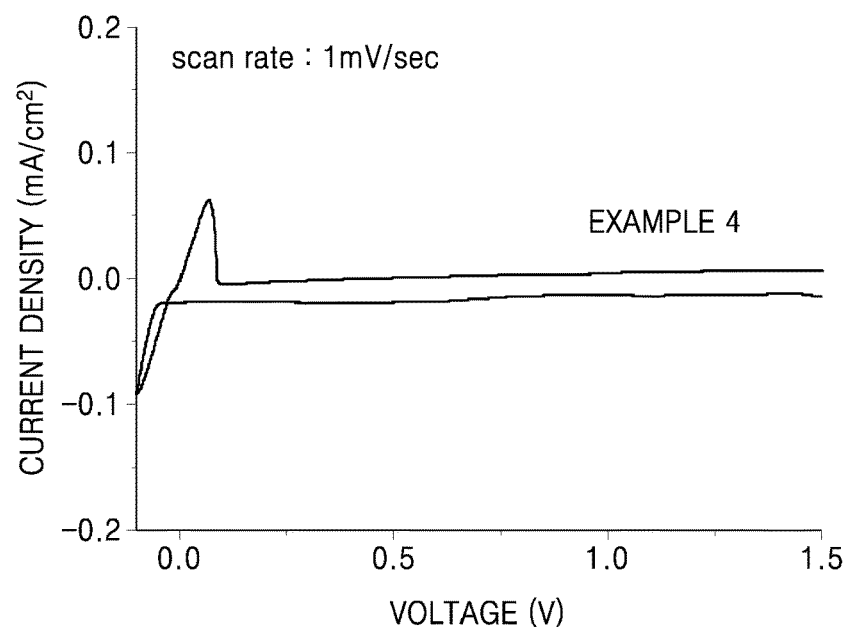
FIGS. 8A and 8B are graphs of current density (milli Amperes per square centimeter, $mA/cm^2$) versus voltage (Volts, V), which show the measurement results of cyclic voltammetry of a lithium battery prepared in Example 5.
Figure 8B:
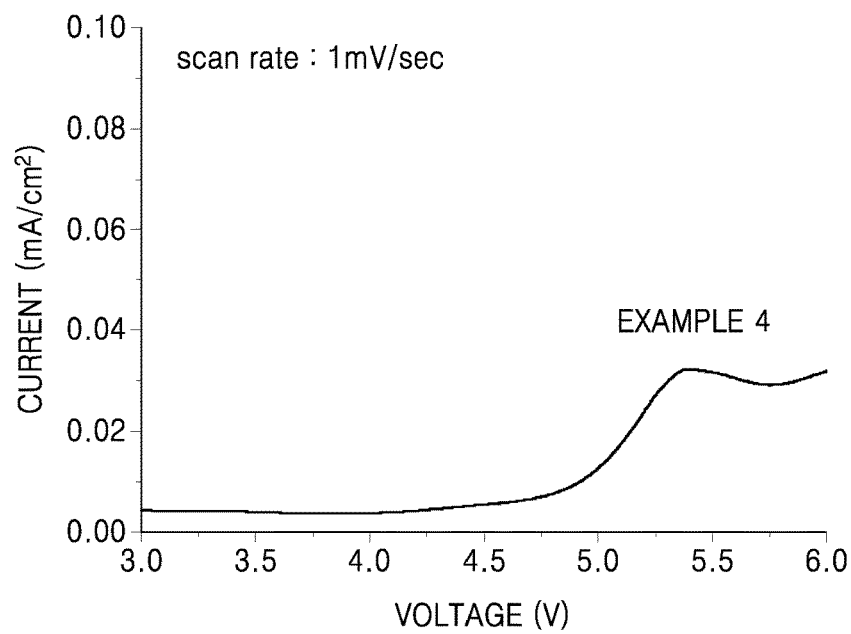

Electrochemical stability of a composite electrolyte layer coating a lithium metal of the lithium batteries prepared in Examples 5 to 8 and Comparative Examples 5 to 8 were evaluated by using a cyclic voltammetry method at a scanning rate of about 1 milli Volts per second (mV/sec) within a voltage range of about 0 Volts (V) to about 6 V (vs. Li), and the results of Example 4 are shown in FIGS. 8A and 8B.

Electrodes (a working electrode and a counter electrode) having a copper current collector were used at a voltage range of about 0 V to about 1.5 V with respect to lithium, and electrodes having an SUS current collector were used at a voltage range of about 3 V to about 6 V with respect to lithium to perform the cyclic voltammetry.

As shown in FIG. 8A, side reactions, such as decomposition of the composite electrolyte layer, other than intercalation/deintercalation of lithium did not occur at around 0 V.

As shown in FIG. 8B, a current caused by side reactions, such as oxidation reaction, was insignificant as about 0.02 milli Amperes per square centimeter ($mA/cm^2$) up to a voltage of about 5.0 V.

Therefore, the composite electrolyte was electrochemically stable within a range of about 0 V to about 5 V.

Evaluation Example 2: Impedance Measurement

A resistance of the membrane-electrode assembly (MEA) was measured by using a 2-probe method with an impedance analyzer (Solartron 1260A Impedance/Gain-Phase Analyzer) with respect to each of the symmetry cells prepared in Examples 9 to 12 and Comparative Examples 9 to 12. A current density was 0.4 $A/cm^2$, an amplitude was ±10 mV, and a frequency range was about 0.1 Hertz (Hz) to about 1 mega Hertz (MHz).

A Nyquist plot of the impedance measurement results of the symmetry cells prepared in Comparative Example 9 and Example 9 in time are each respectively shown in FIGS. 9A and 9B. In FIGS. 9A and 9B, an interfacial resistance ($R_{inf}$) of the electrode is determined by the location and size of a semicircle. A difference between the left side x-intercept and the right side x-intercept of the semicircle denotes an overall resistance ($R_{ovr}$) of an electrode. The analysis results of FIGS. 9A and 9B are shown in Table 1.

TABLE 1

| | Resistance ($R_{ovr}$) [ohm · $cm^2$] | | |
|---|---|---|---|
| Elapsed time | 12 hr | 72 hr | 96 hr |
| Comparative Example 9 | 498 | 1648 | 2098 |
| Example 9 | 128 | 145 | 162 |

As shown in Table 1 and FIGS. 9A and 9B, the symmetry cell of Example 9 included a composite electrolyte coating layer, and thus a resistance of the symmetry cell decreased to about 1/10 after 96 hours compared to that of a symmetry cell of Comparative Example 9, which used a lithium metal as itself.

That is, in the symmetry cell of Example 9, the composite electrolyte stabilized a surface of the lithium metal, and thus an increase in an interface resistance according to duration time was significantly reduced.

Evaluation Example 3: Charging/Discharging Test

The lithium batteries prepared in Examples 13 to 16 and Comparative Examples 13 to 16 were charged and discharged at a constant current of about 1.9 mA/cm² in a voltage range of about 3.0 V to about 4.4 V with respect to lithium at room temperature (25° C.), and the cycle of charging and discharging was repeated 100 times. A part of the charging and discharging test results during the first cycle are shown in FIG. 10 and Table 2.

Figure 10:
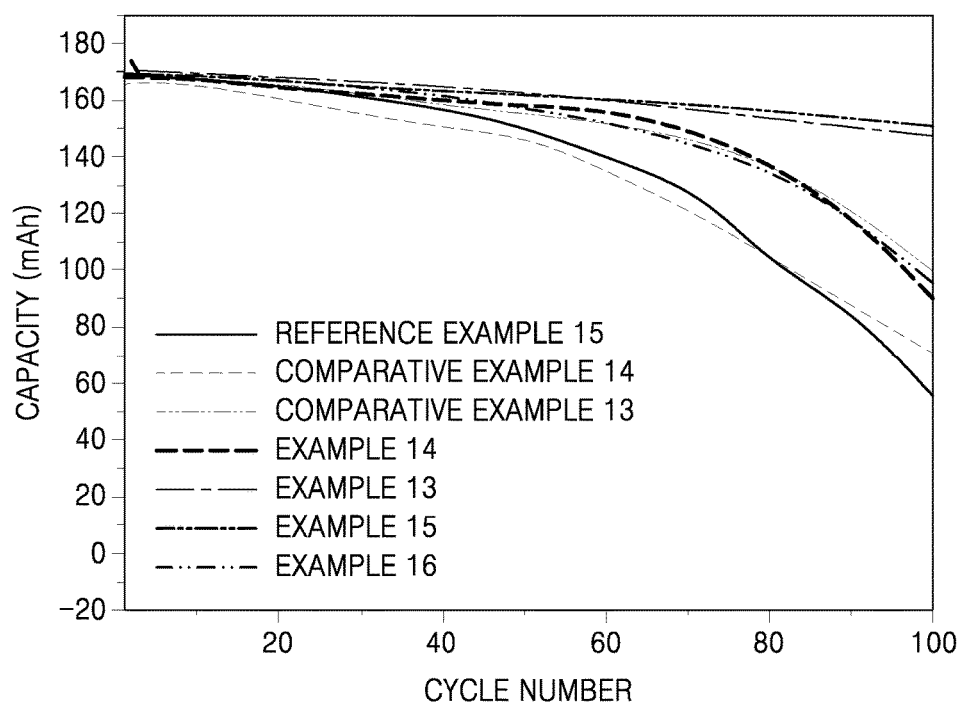
FIG. 10 is a graph of capacity (milli Ampere hours) versus cycle number showing the results of lifespan characteristic test of lithium batteries prepared in Examples 13 to 16, Comparative Examples 13 and 14, and Reference Example 1.

In FIG. 10, a lithium battery of Reference Example 1 was prepared in the same manner as in Example 13, except that a lithium metal itself that is not coated with a composite electrolyte was used as an anode.

Initial discharge capacities, initial charging/discharging efficiencies, and capacity retention rates are shown in Table 2. The initial discharge capacities in Table 2 are discharge capacities during the first cycle. In Table 2, initial coulombic efficiencies are ratios between charging capacities and discharging capacities during the first cycle. The capacity retention rates are calculated from Equation 3.

Capacity retention rate (%)=[Discharge capacity during 100$^{th}$ cycle/Discharge capacity during 1$^{st}$ cycle]×100  Equation 3

TABLE 2

| | Initial discharge capacity [mAh/g] | Initial charge/discharge efficiency [%] | Capacity retention rate during 100$^{th}$ cycle [%] |
|---|---|---|---|
| Example 13 | 176.46 | 97.53 | 87.9 |
| Example 14 | 177.04 | 97.7 | 58.1 |
| Example 15 | 175.96 | 96.63 | 90.5 |
| Example 16 | 174.323 | 97.7 | 60.3 |
| Comparative Example 13 | 174.46 | 97.45 | 64.4 |
| Comparative Example 14 | 168.77 | 95.62 | 48.9 |
| Comparative Example 15 | — | — | — |

As shown in Table 2 and FIG. 10, the lithium batteries prepared in Examples 13 and 15 including the anodes coated with the composite electrolyte layers had significantly improved lifespan characteristics compared to those of the lithium batteries prepared in Comparative Examples 13 and 14. Battery characteristics of the lithium battery prepared in Comparative Example 15 were not measured since an anode was not prepared. Also, the lithium batteries prepared in Examples 13 and 16 had improved initial discharge capacities compared to those of the lithium batteries prepared in Comparative Examples 13 and 14.

As described above, cycle characteristics of a lithium battery may improve when the lithium battery includes a composite electrolyte according to the one or more of the above exemplary embodiments.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite electrolyte comprising:
   a polymeric ionic liquid;
   a plurality of inorganic particles; and
   an organic electrolyte,
   wherein the polymeric ionic liquid is represented by Formula 1a or Formula 1b:

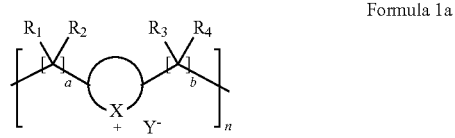

Formula 1a

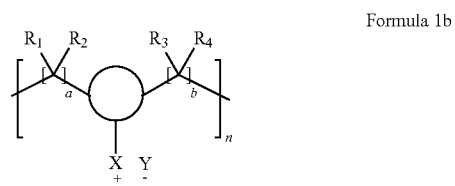

Formula 1b wherein in Formulae 1a and 1b,

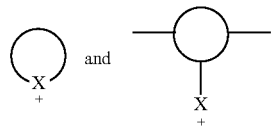

are each independently a 3 to 31 membered group comprising 2 to 30 carbon atoms and optionally at least one heteroatom in addition to X;

X is S, —N(R$_5$)(R$_6$), —N(R$_5$), —P(R$_6$), or —P(R$_5$)(R$_6$);

R$_1$ to R$_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group, wherein "substituted" refers to one substituted with a halogen atom, a C1-C20 alkyl group substituted with one or more halogen atoms, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group;

$Y^-$ in Formula 1a is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$, and $Y^-$ in Formula 1b is an anion;

a and b are each independently an integer of 1 to 5; and n is an integer of 500 to 2,800, wherein a current density of the composite electrolyte due to oxidation reaction at a voltage of around 5.0 V with respect to lithium is 0.05 mA/cm$^2$ or less.

2. The composite electrolyte of claim 1, wherein the inorganic particles comprise at least one selected from a metal oxide, a metal hydroxide, a metal carbonate, a metal carboxylate, a metal silicate, a metal aluminosilicate, a metal carbide, a metal nitride, a metal halide, a metal nitrate, a carbon oxide, a carbonaceous material, and an organic-inorganic composite.

3. The composite electrolyte of claim 1, wherein the inorganic particles comprise at least one selected from $Al_2O_3$, $SiO_2$, $BaTiO_3$, graphite oxide, graphene oxide, metal organic framework, polyhedral oligomeric silsesquioxane, $Li_2CO_3$, $Li_3PO_4$, $Li_3N$, $Li_3S_4$, $Li_2O$, and montmorillonite.

4. The composite electrolyte of claim 1, wherein a particle diameter of the inorganic particles is less than 100 nanometers.

5. The composite electrolyte of claim 1, wherein an amount of the inorganic particles is in a range of about 1 percent by weight to about 95 percent by weight based on the total weight of the inorganic particles and the polymeric ionic liquid.

6. The composite electrolyte of claim 1, wherein an amount of the inorganic particles is in a range of about 30 percent by weight to about 90 percent by weight based on the total weight of the inorganic particles and the polymeric ionic liquid.

7. The composite electrolyte of claim 1, wherein the polymeric ionic liquid is at least one selected from a cationic polymeric ionic liquid, an anionic polymeric ionic liquid, and a zwitterionic polymeric ionic liquid.

8. The composite electrolyte of claim 1, wherein

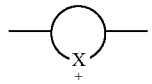

in Formula 1a is represented by Formula 2:

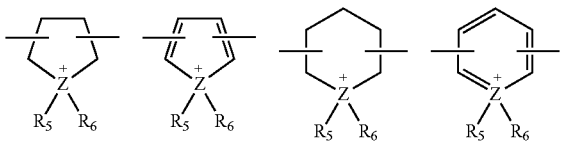

Formula 2 wherein in Formula 2,

Z denotes N, S, or P; and $R_5$ and $R_6$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group, wherein "substituted" refers to one substituted with a halogen atom, a C1-C20 alkyl group substituted with one or more halogen atoms, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group, provided that when Z denotes S, $R_5$ and $R_6$ are absent.

9. The composite electrolyte of claim 1, wherein the polymeric ionic liquid represented by Formula 1a is a polymeric ionic liquid represented by Formula 3:

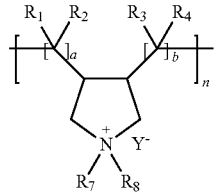

Formula 3 wherein in Formula 3, $R_1$ to $R_8$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group, wherein "substituted" refers to one substituted with a halogen atom, a C1-C20 alkyl group substituted with one or more halogen atoms, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group;

$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$;

a and b are each independently an integer of 1 to 5; and n is an integer of 500 to 2,800.

10. The composite electrolyte of claim 1, wherein the organic electrolyte comprises at least one selected from an organic solvent and an ionic liquid.

11. The composite electrolyte of claim 10, wherein the organic solvent comprises at least one selected from propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, diethyleneglycol, succinonitrile, and dimethylether.

12. The composite electrolyte of claim 10, wherein the ionic liquid is represented by Formula 4a, Formula 4b, or Formula 5:

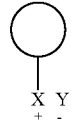

Formula 4a

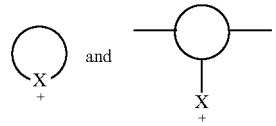

Formula 4b wherein in Formulae 4a and 4b, are each independently a 3 to 31 membered group comprising 2 to 30 carbon atoms and optionally at least one heteroatom in addition to X;

X in Formulae 4a and 4b is independently S, —N($R_5$)($R_6$), —N($R_5$), —P($R_5$), or —P($R_5$)($R_6$); and $Y^-$ in Formula 4a is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$, and wherein $Y^-$ in Formula 4b is an anion,

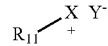

Formula 5 wherein in Formula 5,

X in Formula 5 is the same or different from X in Formulae 4a, and 4b and is independently —N($R_5$)($R_6$), —N($R_5$), —P($R_5$), or —P($R_5$)($R_6$);

$R_{11}$ is an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group; and $Y^-$ in Formula 5 is an anion, which is the same or different from $Y^-$ in Formulae 4a, and 4b, and wherein in Formulae 4a, 4b, and 5, $R_5$ and $R_6$ is each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, or an unsubstituted or substituted C2-C100 alkyleneoxide group, wherein "substituted" refers to one substituted with a halogen atom, a C1-C20 alkyl group substituted with one or more halogen atoms, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

13. The composite electrolyte of claim 12, wherein

in Formula 4a is a cation represented by Formula 6, and

in Formula 5 is a cation represented by Formula 7:

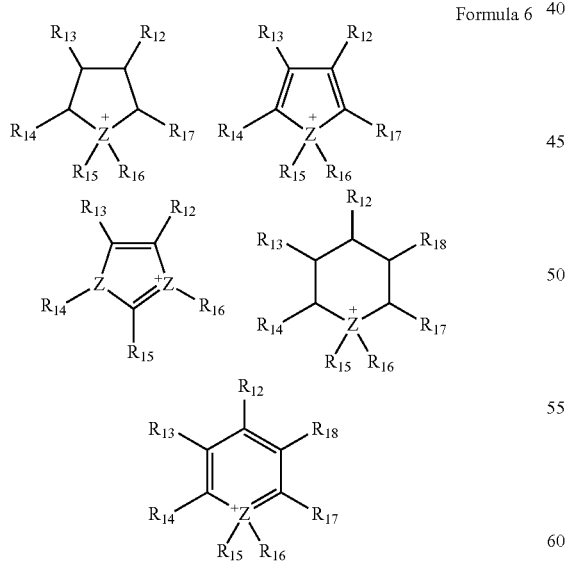

wherein in Formula 6,
Z denotes S, N, or P; and
$R_{12}$ to $R_{18}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group, provided that when Z denotes S, $R_{15}$ and $R_{16}$ are absent;

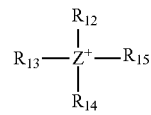

Formula 7 wherein in Formula 7,
Z denotes N or P; and
$R_{12}$ to $R_{15}$ are each independently a hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C6-C30 arylthio group, an unsubstituted or substituted C3-C30 heteroaryl group, an unsubstituted or substituted C4-C30 heteroarylalkyl group, an unsubstituted or substituted C3-C30 heteroaryloxy group, an unsubstituted or substituted C3-C30 heteroarylthio group, an unsubstituted or substituted C3-C30 cycloalkyl group, an unsubstituted or substituted C3-C30 cycloalkyloxy group, an unsubstituted or substituted C3-C30 heterocycloalkyl group, an unsubstituted or substituted C3-C30 alkenyl group, an unsubstituted or substituted C3-C30 alkynyl group, or an unsubstituted or substituted C2-C100 alkyleneoxide group, wherein "substituted" refers to one substituted with a halogen atom, a C1-C20 alkyl group substituted with one or more halogen atoms, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

14. A lithium battery comprising:
a cathode;
an anode; and
an electrolyte layer disposed on at least a part of the anode,
wherein the electrolyte layer comprises the composite electrolyte of claim 1.

15. The lithium battery of claim 14, wherein at least a part of the anode is coated with the electrolyte layer.

16. The lithium battery of claim 14, wherein a thickness of the electrolyte layer is about 40 micrometers or less.

17. The lithium battery of claim 14, wherein, after 96 hours at 25° C., an impedance of the lithium battery is about 10% less than that of a composite electrolyte-free lithium battery.

18. The lithium battery of claim 14 further comprising a separator disposed between the cathode and the anode.

19. The lithium battery of claim 14, wherein the cathode comprises at least one selected from a liquid electrolyte, a gel electrolyte, and a solid electrolyte.

20. The lithium battery of claim 14, wherein the anode comprises a lithium metal.

21. The lithium battery of claim 20, wherein a thickness of the lithium metal is less than about 100 micrometers.

22. The lithium battery of claim 14, further comprising a liquid electrolyte adjacent to the cathode.

23. The lithium battery of claim 22, wherein the cathode is a porous cathode impregnated with the liquid electrolyte.

24. The lithium battery of claim 14, wherein the electrolyte layer has a multi-layer structure comprising two or more layers.

25. The lithium battery of claim 24, wherein the two or more layers have compositions different from each other.

26. The lithium battery of claim 24, wherein the two or more layers comprise at least one selected from a liquid electrolyte, a gel electrolyte, and a solid electrolyte.

27. A lithium battery comprising:
a cathode;
an anode;
a composite electrolyte layer comprising the composite electrolyte of claim 1 adjacent to the cathode; and optionally
a solid electrolyte layer disposed between the composite electrolyte layer and the anode.

28. The lithium battery of claim 27, wherein the solid electrolyte layer comprises at least one selected from an ionically conducting polymer, the polymeric ionic liquid, an inorganic electrolyte, a polymer matrix, and an electronically conducting polymer.

29. The lithium battery of claim 28, wherein the solid electrolyte layer comprises at least one selected from a polyethyleneoxide, a solid graft copolymer including two or more polymer blocks, poly(diallyldimethylammonium)trifluoromethanesulfonylimide (poly(diallyldimethylammonium)TFSI), $Cu_3N$, $Li_3N$, LiPON, $Li_3PO_4.Li_2S.SiS_2$, $Li_2S.GeS_2.Ga_2S_3$, $Li_2O.11Al_2O_3$, $Na_2O.11Al_2O_3$, $(Na, Li)_{1+x} Ti_{2-x}Al_x(PO_4)_3$, wherein $0.1 \leq x \leq 0.9$), $Li_{1+x}Hf_{2-x}Al_x(PO_4)_3$, wherein $0.1 \leq x \leq 0.9$, $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$, wherein M is a rare earth element, such as Nd, Gd, or Dy, $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x (Ge_{1-y}Ti_y)_{2-x}(PO_4)_3$ wherein $0.1 \leq x \leq 0.8$, $0 \leq y \leq 1.0$, and M is Nd, Sm, Eu, Gd, Tb, Dy, Ho, Er, Tm, or Yb, $Li_{1+x+y}Q_x Ti_{2-x}i_yP_{3-y}O_{12}$, wherein $0 < x \leq 0.4$, $0 < y \leq 0.6$, and Q is Al or Ga, $Li_6BaLa_2Ta_2O_{12}$, $Li_7La_3Zr_2O_{12}$, $Li_5La_3Nb_2O_{12}$, $Li_5La_3M_2O_{12}$, wherein M is Nb or Ta, and $Li_{7+x}A_x La_{3-x}Zr_2O_{12}$, wherein $0 < x < 3$, and A is Zn.

30. The lithium battery of claim 28, wherein the ionically conducting polymer is a block copolymer comprising an ion conductive phase and a structural phase.

31. The lithium battery of claim 28, wherein an ionically conducting polymer comprises an ion conductive repeating unit that is at least one selected from an ether monomer, an acryl monomer, a methacryl monomer, and a siloxane monomer.

32. The lithium battery of claim 31, wherein the ionically conducting polymer is at least one selected from polyethyleneoxide, polypropyleneoxide, polymethylmethacrylate, polyethylmethacrylate, polydimethylsiloxane, polyacrylic acid, polymethacrylic acid, polymethylacrylate, polyethylacrylate, poly-2-ethylhexylacrylate, polybutylmethacrylate, poly-2-ethylhexylmethacrylate, polydecylacrylate, and polyethylenevinylacetate.

33. The lithium battery of claim 29, wherein the ionically conducting polymer is a copolymer comprising an ion conductive repeating unit and a structural repeating unit.

34. The lithium battery of claim 33, wherein
the ion conductive repeating unit is derived from at least one monomer selected from acrylic acid, methacrylic acid, methyl acrylate, methyl methacrylate, ethylacrylate, ethylmethacrylate, 2-ethylhexylacrylate, butylmethacrylate, 2-ethylhexylmethacrylate, decylacrylate, ethylenevinylacetate, ethylene oxide, and propylene oxide, and
the structural repeating unit is derived from at least one monomer selected from styrene, 4-bromo styrene, tert-butyl styrene, divinylbenzene, methyl methacrylate, isobutyl methacrylate, butadiene, ethylene, propylene, dimethylsiloxane, isobutylene, N-isopropyl acrylamide, vinylidene fluoride, acrylonitrile, 4-methylpentene-1, butylene terephthalate, ethylene terephthalate, and vinyl pyridine.

* * * * *